United States Patent
Kurniawan et al.

(10) Patent No.: US 12,079,781 B2
(45) Date of Patent: Sep. 3, 2024

(54) REMOTE MONITORING AND MANAGEMENT OF ASSETS FROM A PORTFOLIO OF ASSETS BASED ON AN ASSET MODEL

(71) Applicant: Honeywell International Inc., Charlotte, NC (US)

(72) Inventors: Andie Kurniawan, North Ryde (AU); Aditya Vijay Patil, Bangalore (IN); Andrew Firmage, North Ryde (AU); Shailesh Rasane, North Ryde (AU); Simon Redvers, Bracknell (GB)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 17/698,613

(22) Filed: Mar. 18, 2022

(65) Prior Publication Data
US 2022/0309475 A1 Sep. 29, 2022

Related U.S. Application Data

(60) Provisional application No. 63/165,472, filed on Mar. 24, 2021.

(51) Int. Cl.
G06F 16/00 (2019.01)
G06F 16/248 (2019.01)
G06Q 10/20 (2023.01)

(52) U.S. Cl.
CPC ............ *G06Q 10/20* (2013.01); *G06F 16/248* (2019.01)

(58) Field of Classification Search
CPC .............................. G06Q 10/20; G06F 16/248
See application file for complete search history.

(56) References Cited

U.S. PATENT DOCUMENTS

| 10,970,298 B1 * | 4/2021 | Madheswaran | ......... H04L 41/22 |
| 2020/0117757 A1 * | 4/2020 | Yanamandra | ....... H04L 41/5064 |
| 2021/0096542 A1 * | 4/2021 | Stump | ................ G05B 23/0289 |

* cited by examiner

*Primary Examiner* — Paul Kim
(74) *Attorney, Agent, or Firm* — Alston & Bird LLP

(57) ABSTRACT

Various embodiments described herein relate to remote monitoring and management of assets from a portfolio of assets based on an asset model. In this regard, a request to generate a dashboard visualization associated with a portfolio of assets is received. The request includes an asset descriptor that describes one or more assets in the portfolio of assets. In response to the request, aggregated data associated with the portfolio of assets is obtained based on the asset descriptor. Contextual data is also determined for the portfolio of assets based on asset relationship data for the aggregated data. Based on the contextual data, prioritized actions for the portfolio of assets are determined. Furthermore, the dashboard visualization is provided to an electronic interface of a computing device, the dashboard visualization comprising the prioritized actions for the portfolio of assets.

19 Claims, 14 Drawing Sheets

RELATED ASSETS
VF07V11_1L02
SEARCH FOR ASSETS

SUPPLY FROM
⦿ AV1_1

---

ASSET_B

DETAILS | PROPERTIES

SERVIEDSPACE AIR TEMPERA... °C
27.7

SERVIEDSPACE AIR TEMPERA... °C
24.71

SUPPLYAIR DAMPER AIR P... %
0

---

⦿ ASSET_B FAULT
SERVICE CASE

DETAILS | ACTIVITY

DATE CREATED                          MOVE TO:
01/12/2020, 21:44:04                  IN PROGRESS

CASE NUMBER/WORK ORDER                SET PRIORITY TO:
C409270                               MEDIUM

ASSIGNED TO GROUP                     ASSIGN TO GROUP:
                                      SELECT

ASSET                                 VALUE
VF07V11_IL102  ⌘

SOURCE                                OUTCOME TARGET
ASSET ANALYTICS                       ⚙ OPERATIONS

LOCATION
LOCATION_B

DESCRIPTION
ZONE TEMPERATURE SENSOR VALUE OUT OF LIMIT-ZONE
TEMPERATURE SENSOR IS HIGHER THAN 35 C (ADJ) OR
LOWER THAN 10 C (ADJ).

THE ABOVE CONDITIONS TO REMAIN TRUE FOR >30 MINS
(ADJ) 2 (ADJ) TIMES OR MORE IN A DAY OR >60MINS
(ADJ) ONCE IN A DAY TO TRIGGER THE

< >HOME
PORTFOLIO OPERATIONS

TRIAGE LIST — 1100

| SORT ⌄ | SEVERITY ⌄ | STATUS ⌄ | TYPE ⌄ | ASSET NAME ⌄ | ▼ALL FILTERS | | | ⌕SEARCH TABLE |

1-13 OF 100 | NO FILTERS APPLIED

| ☐ ⌄ | SEVERITY ⌄ | DESCRIPTION ⌄ | TYPE ⌄ | LOCATION ⌄ | SITE ⌄ | TIME ⌄ | STATUS ⌄ |
|---|---|---|---|---|---|---|---|
| ⌄☐ ⋯ L0-R1-AHU-01 (12) | | | | | | | |
| ⌄☐ ⋯ L0-R2-AHU-01 (5) | | | | | | | |
| ☐ ⋯ | MEDIUM | INLET VALVE PRESSURE LIMIT BREACHED | ANALYTICAL ALERT | PLANT ROOM A FLOOR 1 | SYDNEY | 3/6/2019 13:21:00 | SERVICE CASE |
| ☐ ⋯ | LOW | INLET VALVE PRESSURE LIMIT BREACHED | ALARM | PLANT ROOM A FLOOR 1 | SYDNEY | 3/6/2019 13:21:00 | IDENTIFIED |
| ☐ ⋯ | LOW | INLET VALVE PRESSURE LIMIT BREACHED | ALARM | PLANT ROOM A FLOOR 1 | SYDNEY | 3/6/2019 13:21:00 | SERVICE CASE |
| ☐ ⋯ | LOW | INLET VALVE PRESSURE LIMIT BREACHED | ANALYTICAL ALERT | PLANT ROOM A FLOOR 1 | SYDNEY | 3/6/2019 13:21:00 | SERVICE CASE |
| ☐ ⋯ | HIGH | INLET VALVE PRESSURE LIMIT BREACHED | ALARM | PLANT ROOM A FLOOR 1 | SYDNEY | 3/6/2019 13:21:00 | IDENTIFIED |
| ⌄☐ ⋯ L1-R2-AHU-01 (4) | | | | | | | |
| ☐ ⋯ | HIGH | INLET VALVE PRESSURE LIMIT BREACHED | ALARM | PLANT ROOM A FLOOR 16 | MELBOURNE | 3/6/2019 13:21:00 | SERVICE CASE |
| ☐ ⋯ | LOW | INLET VALVE PRESSURE LIMIT BREACHED | ANALYTICAL ALERT | PLANT ROOM A FLOOR 16 | MELBOURNE | 3/6/2019 13:21:00 | SERVICE CASE |
| ☐ ⋯ | LOW | INLET VALVE PRESSURE LIMIT BREACHED | ANALYTICAL ALERT | PLANT ROOM A FLOOR 16 | MELBOURNE | 3/6/2019 13:21:00 | SERVICE CASE |
| ☐ ⋯ | LOW | INLET VALVE PRESSURE LIMIT BREACHED | ALARM | PLANT ROOM A FLOOR 16 | MELBOURNE | 3/6/2019 13:21:00 | SERVICE CASE |
| ⌄☐ ⋯ L1-R1-AHU-02 (6) | | | | | | | |

1-13 OF 100 ITEMS    < 1 2 3 4 5 … # >    GO TO PAGE [ 1 ]

FIG. 11

SERVICE CASES

◉ | ALL SITES ⌄ | | YEAR TO DATE ⌄ | SEARCH FOR SERVICE CASES ⌕ ▭

| PRIORITY ◇ | ASSET ◇ | SERVICE CASE ◇ | DESCRIPTION ◇ | SITE ◇ | LOCATION ◇ | LATEST ALERT RAISED ◇ |
|---|---|---|---|---|---|---|
| ⌄ | ◉ SMKDET1 | OUTSIDE DAMPER STUCK +2 | | BRISBANE | FLOOR 01 PLANT ROOM 001 | 11:45 25/6/2019 |
| ⌄ | ◉ AHU1 | OUTSIDE DAMPER STUCK +2 | | SYDNEY | T2 PIERA RAMP | 11:45 25/6/2019 |
| ⌄ | ◉ VAV5 | HIGH ROOM HUMIDITY +5 | | MELBOURNE | FLOOR 01 PLANT ROOM 003 | 11:45 25/6/2019 |
| ⌄ | ◉ VAV9 | OUTSIDE DAMPER STUCK +2 | | HOBART | SECURITY FENCE ZONE1-2 PIC1 INPUT... | 11:45 25/6/2019 |
| ⌄ | ◉ VAV2 | ZONE HOT WHEN NO COOLING +2 | | PERTH | T1 CLEANERS OFFICE | 11:45 25/6/2019 |
| ⌃ | ○ L1-R1-AHU-01 | OUTSIDE DAMPER STUCK +2 | | SYDNEY | T2 PIERA RAMP | 11:45 25/6/2019 |

| SERVICE CASE NO. ◇ | STATUS ◇ | DESCRIPTION ◇ | LAST UPDATED ◇ | COST OF FAULT ◇ | LATEST ALERT RAISED ◇ |
|---|---|---|---|---|---|
| ◉ C229482 | IDENTIFIED | ZONE HOT WHEN NO COOLING AND HEATING | 11:25:00 25/6/2019 | $524/DAY | 11:45 25/6/2019 |
| ○ C229473 | IDENTIFIED | OUTSIDE DAMPERS STUCK | 11:25:00 26/6/2019 | $207/DAY | 11:45 25/6/2019 |
| ○ C229479 | INPROGRESS | HIGH ROOM HUMIDITY | 11:45:00 25/6/2019 | $55/DAY | 11:45 25/6/2019 |

| | | | | | | |
|---|---|---|---|---|---|---|
| ⌄ | ○ SENSOR18 | OUTSIDE DAMPER STUCK | | MELBOURNE | T2 PIERA RAMP | 11:45 25/6/2019 |
| ⌄ | ○ WAV02 | ZONE HOT WHEN NO COOLING | | HOBART | PIER C AIR GATE53 | 11:45 25/6/2019 |
| ⌄ | ○ SMKDET12 | HIGH ROOM HUMIDITY | | BRISBANE | LEVEL 1 LOBBY | 11:45 25/6/2019 |
| ⌄ | ○ CAMERA | ZONE HOT WHEN NO COOLING | | MELBOURNE | PIER B GOODS INTERLOCK A/S | 11:45 25/6/2019 |
| ⌄ | ○ PUMP4 | HIGH ROOM HUMIDITY | | HOBART | T2 PIERA RAMP | 11:45 25/6/2019 |
| ⌄ | ○ CAMERA | HOT ZONE WHEN NO COOLING... | | BRISBANE | CAMERA T1_858_AB_A_PBB | 11:45 25/6/2019 |
| ⌄ | ○ PUMP3 | HIGH ROOM HUMIDITY | | MELBOURNE | 400 GEORGE ST, INVESTA SYDNEY | 11:45 25/6/2019 |

FIG. 12

REMOTE MONITORING AND MANAGEMENT OF ASSETS FROM A PORTFOLIO OF ASSETS BASED ON AN ASSET MODEL

CROSS REFERENCE TO RELATED APPLICATIONS

This application claims the benefit of U.S. Provisional Patent Application No. 63/165,472, titled "REMOTE MONITORING AND MANAGEMENT OF ASSETS FROM A PORTFOLIO OF ASSETS BASED ON AN ASSET MODEL," and filed on Mar. 24, 2021, the entirety of which is hereby incorporated by reference.

TECHNICAL FIELD

The present disclosure relates generally to real-time asset analytics, and more particularly to remote monitoring and management of assets from a portfolio of assets based on an asset model.

BACKGROUND

Traditionally, data analytics and/or digital transformation of data related to assets generally involves human interaction. However, often times a specialized worker (e.g., a manager) is responsible for a large portfolio of assets (e.g., 1000 buildings each with 100 assets such as a boiler, a chiller, a pump, sensors, etc.). Therefore, it is generally difficult to identify and/or fix issues with the large portfolio of assets. For example, in certain scenarios, multiple assets (e.g., 25 assets) from the large portfolio of assets may have an issue. Furthermore, a limited amount of time is traditionally spent on modeling of data related to assets to, for example, provide insights related to the data. As such, computing resources related to data analytics and/or digital transformation of data related to assets are traditionally employed in an inefficient manner.

SUMMARY

The details of some embodiments of the subject matter described in this specification are set forth in the accompanying drawings and the description below. Other features, aspects, and advantages of the subject matter will become apparent from the description, the drawings, and the claims.

In an embodiment, a system comprises one or more processors, a memory, and one or more programs stored in the memory. The one or more programs comprise instructions configured to receive a request to generate a dashboard visualization associated with a portfolio of assets. The request comprises an asset descriptor describing one or more assets in the portfolio of assets. The one or more programs also comprise instructions configured to, in response to the request, obtain, based on the asset descriptor, aggregated data associated with the portfolio of assets. The one or more programs also comprise instructions configured to, in response to the request, determine contextual data for the portfolio of assets based on asset relationship data for the aggregated data. The one or more programs also comprise instructions configured to, in response to the request, determine prioritized actions for the portfolio of assets based on the contextual data. The one or more programs also comprise instructions configured to, in response to the request, provide the dashboard visualization to an electronic interface of a computing device. The dashboard visualization comprises the prioritized actions for the portfolio of assets.

In another embodiment, a method comprises, at a device with one or more processors and a memory, receiving a request to generate a dashboard visualization associated with a portfolio of assets. The request comprises an asset descriptor describing one or more assets in the portfolio of assets. In response to the request, the method comprises obtaining, based on the asset descriptor, aggregated data associated with the portfolio of assets. In response to the request, the method comprises determining contextual data for the portfolio of assets based on asset relationship data for the aggregated data. In response to the request, the method comprises determining prioritized actions for the portfolio of assets based on the contextual data. In response to the request, the method comprises providing the dashboard visualization to an electronic interface of a computing device. The dashboard visualization comprises the prioritized actions for the portfolio of assets.

In yet another embodiment, a non-transitory computer-readable storage medium comprises one or more programs for execution by one or more processors of a device. The one or more programs comprise instructions which, when executed by the one or more processors, cause the device to receive a request to generate a dashboard visualization associated with a portfolio of assets. The request comprises an asset descriptor describing one or more assets in the portfolio of assets.

The one or more programs also comprise instructions which, when executed by the one or more processors, cause the device to, in response to the request, obtain, based on the asset descriptor, aggregated data associated with the portfolio of assets.

The one or more programs also comprise instructions which, when executed by the one or more processors, cause the device to, in response to the request, determine contextual data for the portfolio of assets based on asset relationship data for the aggregated data.

The one or more programs also comprise instructions which, when executed by the one or more processors, cause the device to, in response to the request, determine prioritized actions for the portfolio of assets based on the contextual data.

The one or more programs also comprise instructions which, when executed by the one or more processors, cause the device to, in response to the request, provide the dashboard visualization to an electronic interface of a computing device. The dashboard visualization comprises the prioritized actions for the portfolio of assets.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 9 illustrates an exemplary electronic interface, in accordance with one or more embodiments described herein;

FIG. 10 illustrates another exemplary electronic interface, in accordance with one or more embodiments described herein;

FIG. 11 illustrates another exemplary electronic interface, in accordance with one or more embodiments described herein;

FIG. 12 illustrates another exemplary electronic interface, in accordance with one or more embodiments described herein;

DETAILED DESCRIPTION

Figure 1:
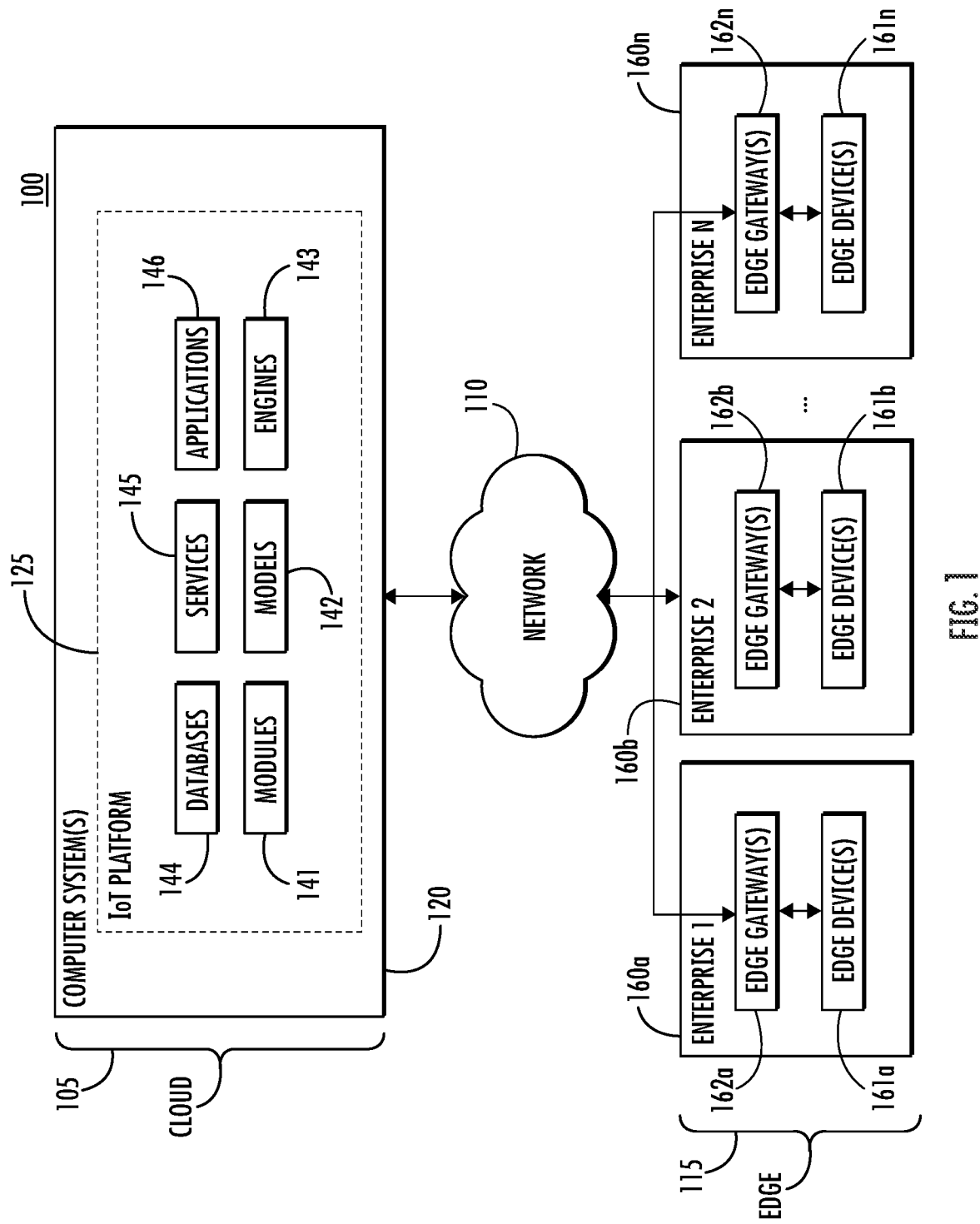
FIG. 1 illustrates an exemplary networked computing system environment, in accordance with one or more embodiments described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments. The term "or" is used herein in both the alternative and conjunctive sense, unless otherwise indicated. The terms "illustrative," "example," and "exemplary" are used to be examples with no indication of quality level. Like numbers refer to like elements throughout.

The phrases "in an embodiment," "in one embodiment," "according to one embodiment," and the like generally mean that the particular feature, structure, or characteristic following the phrase can be included in at least one embodiment of the present disclosure, and can be included in more than one embodiment of the present disclosure (importantly, such phrases do not necessarily refer to the same embodiment).

The word "exemplary" is used herein to mean "serving as an example, instance, or illustration." Any implementation described herein as "exemplary" is not necessarily to be construed as preferred or advantageous over other implementations.

If the specification states a component or feature "can," "may," "could," "should," "would," "preferably," "possibly," "typically," "optionally," "for example," "often," or "might" (or other such language) be included or have a characteristic, that particular component or feature is not required to be included or to have the characteristic. Such component or feature can be optionally included in some embodiments, or it can be excluded.

In general, the present disclosure provides for an "Internet-of-Things" or "IoT" platform for enterprise performance management that uses real-time accurate models and visual analytics to deliver intelligent actionable recommendations for sustained peak performance of an enterprise or organization. The IoT platform is an extensible platform that is portable for deployment in any cloud or data center environment for providing an enterprise-wide, top to bottom view, displaying the status of processes, assets, people, and safety. Further, the IoT platform of the present disclosure supports end-to-end capability to execute digital twins against process data and to translate the output into actionable insights, as detailed in the following description.

Traditionally, data analytics and/or digital transformation of data related to assets generally involves human interaction. However, often times a specialized worker (e.g., a manager) is responsible for a large portfolio of assets (e.g., 1000 buildings each with 100 assets such as a boiler, a chiller, a pump, sensors, etc.). Therefore, it is generally difficult to identify and/or fix issues with the large portfolio of assets. For example, in certain scenarios, multiple assets (e.g., 25 assets) from the large portfolio of assets may have an issue. Furthermore, a limited amount of time is traditionally spent on modeling of data related to assets to, for example, provide insights related to the data. As such, computing resources related to data analytics and/or digital transformation of data related to assets are traditionally employed in an inefficient manner.

As an example, it is generally desirable for management personnel (e.g., executives, managers, etc.) to be provided with an understanding of which assets from a portfolio of assets require service, which assets from a portfolio of assets should be serviced first, etc. Additionally, it is generally desirable for management personnel (e.g., executives, managers, etc.) to be provided with improved technology to facilitate servicing of assets from a portfolio of assets. For example, traditional dashboard technology generally involves manual configuration of the dashboard to, for example, provide different insights for assets. Furthermore, traditional dashboard technology employed with dashboard data modelling of assets is generally implemented outside of a core application and/or asset model. Therefore, it is generally difficult to execute data modelling for assets in an efficient and/or accurate manner.

Thus, to address these and/or other issues, remote monitoring and management of assets from a portfolio of assets based on an asset model is provided. In various embodiments, data associated with one or more assets from a portfolio of assets is ingested, cleaned and aggregated to provide aggregated data. Furthermore, in various embodiments, contextual data is determined based on asset relationship data for the aggregated data to provide opportunity and/or performance insights for the one or more assets from the portfolio of assets. In an embodiment, the asset relationship data is determined based on an asset model. In one or more embodiments, the asset relationship data describes relationships between different assets in the portfolio of assets. In one or more embodiments, the asset relationship data provides a correlation of assets to a fault status of the assets. In one or more embodiments, the asset relationship data provides information regarding whether related assets are associated with a fault and/or enables determination of a potential root cause. In one or more embodiments, the asset relationship data is determined by traversing data associated with related assets. In one or more embodiments, the asset relationship data provides a status of each asset in the portfolio of assets. In one or more embodiments, the asset relationship data provides an indication of asset relationship information such as, for example, 'supply to', 'contains', 'supply from', etc. The contextual data includes, for example, live property values, historical trends, asset relationships (e.g., asset relationship of an asset in service and/or service cases in related assets), and/or other data that provides contextual awareness for the one or more assets from the portfolio of assets. In various embodiments, prioritized actions for the portfolio of actions are determined based on the contextual data.

According to various embodiments, a dashboard visualization that presents prioritized actions associated with one or more assets from the portfolio of assets is provided. In various embodiments, the dashboard visualization is an enterprise application that allows a portfolio operator to remotely manage, investigate, and/or resolve issues associated with the portfolio of assets. For example, in various embodiments, the dashboard visualization facilitates connection of disparate asset systems to monitor and/or maintain the portfolio of assets. Integrating disparate asset systems into a unified connected system enables a user to interact with the aggregated data in a single view. The dashboard visualization also provides context awareness for the portfolio of assets and allows a user located remotely from the one or more assets in the portfolio of assets to understand issues related the portfolio of assets (e.g., without the need to understand the technology of each of the disparate asset systems). In certain embodiments, the dashboard visualization also facilitates managing different field protocols with multiple levels of intermediate supervisory control and data acquisition (SCADA) server systems while also providing uniform interactions. In various embodiments, the dashboard visualization is configured to provide control of assets (e.g., equipment) remotely using one or more protocols and/or with respect to different types of asset management systems in a portfolio of assets. In various embodiments, the dashboard visualization is accessible via a web portal and/or an application interface. In various embodiments, the dashboard visualization presents insights such as, for example, whether there is a fault on a related asset, the priority of a fault in a related asset, further details (e.g., interactive status data and/or asset description data) regarding a related asset.

In various embodiments, a request to generate a dashboard visualization associated with a portfolio of assets is received. The request includes an asset descriptor that describes one or more assets in the portfolio of assets. In response to the request, aggregated data associated with the portfolio of assets is obtained based on the asset descriptor. Contextual data is also determined for the portfolio of assets based on asset relationship data for the aggregated data. Based on the contextual data, prioritized actions for the portfolio of assets are determined. Furthermore, the dashboard visualization is provided to an electronic interface of a computing device, the dashboard visualization comprising the prioritized actions for the portfolio of assets. In certain embodiments, the dashboard visualization is configured to provide remote control of at least one asset from the portfolio of assets based on the prioritized actions for the portfolio of assets. In certain embodiments, the portfolio of assets is a portfolio of SCADA systems. Furthermore, in certain embodiments, the asset descriptor is a SCADA system descriptor that describes one or more SCADA systems in the portfolio of SCADA systems. Accordingly, in certain embodiments, the contextual data is determined for the portfolio of SCADA systems.

In various embodiments, a single SCADA system manages multiple SCADA systems. For example, in various embodiments, each asset is connected to a single SCADA system (e.g., an asset management system). In various embodiments, a subscription service is integrated with an internet of things platform to acquire the aggregated data and/or to cache the aggregated data for scaling purposes and/or robustness.

In various embodiments, the dashboard visualization facilitates aggregation of asset performance data into a score or metric value such as, for example, a key performance indicator (KPI). In various embodiments, the dashboard visualization additionally or alternatively facilitates providing recommendations to improve asset performance. In various embodiments, the dashboard visualization additionally or alternatively facilitates remote control and/or altering of asset set points. In one or more embodiments, the issues associated with the one or more assets are ordered such that issues with a largest impact with respect to the portfolio of assets is presented first via the dashboard visualization. Impact may be based on cost to repair an asset, energy consumption associated with issues related to the one or more assets, savings lost associated with issues related to the one or more assets, etc.

In various embodiments, a user may employ the dashboard visualization to identify issues associated with the portfolio of assets, to make adjustments with respect to the portfolio of assets, and/or to make work orders associated with the portfolio of assets. In various embodiments, a user may be subscribed to a performance management category (e.g., Energy Optimization, Digitized Maintenance, etc.) to facilitate determining issues for the portfolio of assets to be resolved and/or to facilitate determining an ordering for prioritized actions related to the portfolio of assets. For example, an ordering of prioritized actions may be different for Energy Optimization than Digitized Maintenance. In various embodiments, the dashboard visualization provides an alerts list that combines alerts from an on-premise building management system (BMS). In various embodiments, cloud analytics is performed to group alerts based on issues and/or to prioritize the issues based on one or more algorithms. In various embodiments, the dashboard visualization provides an issue analysis triage solution that employs one or more data models to automatically present information to facilitate analysis and/or actions related to alerts. In various embodiments, the dashboard visualization provides a service case management solution that is integrated into a building management technical solution to create issue-based cases related alerts and/or asset links. In various embodiments, the dashboard visualization centralizes portfolio operations to a single location to allow operators to easily understand an operational status of assets, to investigate issues related to assets, and/or to make control changes related to assets. As such, according to various embodiments, asset and/or workforce use is optimized, and highest priority issues related to the portfolio of assets is presented to a user in an optimal manner. Additionally, according to various embodiments, facility operating and/or maintenance costs are reduced while also improving equipment up-time, service operational efficiency, and/or environmental conditions by employing the dashboard visualization. Additionally, by employing the dashboard visualization according to various embodiments, remote triage of faults and/or remote resolution of asset issues is provided. Additionally, according to various embodiments, the dashboard visualization provides centralized capability to review, manage and/or control assets.

In various embodiments, the dashboard visualization facilitates alert and/or case management related to the portfolio of assets. For example, in various embodiments, the dashboard visualization provides a consolidated view of alerts from analytical products and/or directly from on-site systems that are combined into rich service cases. In various embodiments, the dashboard visualization facilitates triage and control. For example, in various embodiments, the dashboard visualization provides real-time data and/or historical trends related to assets. In various embodiments, features, attributes and/or relationships associated with the real-time data and/or historical trends are determined based on one or more artificial intelligence systems to, for example, trouble-shoot equipment faults, control equipment, and/or change set-points to resolve issues within the dashboard visualization.

In various embodiments, the dashboard visualization facilitates display of graphics and/or other visualizations related to the portfolio of assets. For example, in various embodiments, the dashboard visualization provides dynamically generated graphics that show configuration of, relationships between, and/or location of assets in the portfolio of assets to, for example, enable knowledge associated with remote facilities, aiding of fault diagnosis, and/or performing actions related to issues. In various embodiments, the dashboard visualization facilitates operations and/or scheduling associated with the portfolio of assets. For example, in various embodiments, the dashboard visualization facilitate temporary or long-term changes to operational modes of assets can be made through scheduling changes and/or manual switching to allow for events, seasonal changes, maintenance periods and/or other changes to asset use or operations.

In various embodiments, the dashboard visualization presents alerts from different sources and/or different system types into a single alert screen to provide a prioritized view of issues related to a portfolio of assets. According to various embodiments, the alerts include alarms from on-premises BMS, security, fire and other systems. Additionally or alternatively, according to various embodiments, the alerts include alerts from analytics and/or rule-based cloud-located systems with respect to current states and/or historical states of assets. Additionally or alternatively, according to various embodiments, the alerts include alerts from systems monitoring an asset environment and/or health and safety conditions associated with assets. Additionally or alternatively, according to various embodiments, the alerts include alerts from cyber security systems. Additionally or alternatively, according to various embodiments, the alerts include alerts from systems monitoring of the health of assets. Additionally or alternatively, according to various embodiments, the alerts include manually entered alerts that may arise due to calls from building occupants, staff, technicians, etc. In various embodiments, the alerts are logically grouped and/or presented to an operator via the dashboard visualization. In various embodiments, the alerts are logically grouped based on location (e.g., geographic areas or buildings) and/or related assets. In various embodiments, the alerts are presented via the dashboard visualization such that the highest priority issues are at the top of the list of alerts. In various embodiments, prioritization of the alerts is determined based on type of asset, type of facility, use and size of area affected by the issues, number of assets, number of issues, types assigned priority of individual alerts, and/or other features associated with the assets. In various embodiments, machine learning is employed to logically grouped and/or present the alerts. In various embodiments, machine learning is employed to identify alerts that optimally reflect use by an operator of the dashboard visualization.

In various embodiments, an extensible object model is employed to provide automated display of real-time properties and trends related to service cases into tabular and graphical displays. Additionally or alternatively, in various embodiments, an extensible object model is employed to provide automated generation and display of equipment schematic diagrams and configurations using standard or modular diagrams populated by model data. Additionally or alternatively, in various embodiments, an extensible object model is employed to create a graph model view of relationships between assets in the portfolio of assets (e.g., between equipment and/or other assets in the facilities, between building and physical spaces within buildings, etc.). Additionally or alternatively, in various embodiments, an extensible object model is employed to determine relationships between models such that nodes in the graph visually indicates whether the portfolio of assets is associated with one or more alarms related to the nodes. Additionally or alternatively, in various embodiments, an extensible object model is employed to provide information notifications via the nodes with asset data and/or links to other information.

In various embodiments, the dashboard visualization is provided to drive and/or provide opportunity at an asset level, a plant level, a site level, and/or an enterprise level based on metrics such as metrics related to safety, risk, energy/utility cost, overall equipment effectiveness (OEE), performance indicators, etc. In various embodiments, metric monitoring for one or more assets is customizable. For example, in one or more embodiments, metric monitoring for one or more assets is configurable for different reporting intervals of time (e.g., daily metric monitoring (1-24 hr), monthly metric monitoring (first day of month to last day of month), yearly metric monitoring first month to last month of a year), etc.). In another example, in one or more embodiments, a start of a reporting period for metric monitoring and end of a reporting period for metric monitoring is configurable (e.g., metric monitoring starting at 7 am and ending at 3 pm, metric monitoring starting at the first day of the month and ending at the tenth day of the month, metric monitoring starting in April and ending in December, etc.).

In various embodiments, a dashboard visualization across various user identities is provided via a templated dashboard model using, for example, an extensible object model. In various embodiments, a dashboard visualization for a particular user identity (e.g., a maintenance is reported at various hierarchy levels such as an enterprise level, a site level, a plant level, a unit level (e.g., an asset level), etc. In various embodiments, metrics associated with a first asset hierarchy level (e.g., an enterprise level) includes metrics or goals (e.g., OEE, etc.). In various embodiments, metrics associated with a second asset hierarchy level (e.g., a site level) includes metrics that influence a target goal (e.g., availability, energy, performance, quality). In various embodiments, metrics associated with a third asset hierarchy level (e.g., a plant level) includes identification of undesirable actor assets that influences targeted goal OEE. In various embodiments, metrics associated with a fourth asset hierarchy level (e.g., an asset level) includes events or exception that are related to a target goal.

In various embodiments, an application programming interface is employed to integrate different visualization tools and/or different reporting tools (e.g., via the dashboard visualization). In one or more embodiments, a user-interactive graphical user interface is generated. For instance, in one or more embodiments, the graphical user interface renders a visual representation of the dashboard visualization. In one or more embodiments, one or more notifications for user devices are generated based on metrics associated with one or more assets of the portfolio of assets.

In one or more embodiments, the dashboard visualization allows a user to see how one or more assets are performing against one or more metrics (e.g., one or more KPIs). In one or more embodiments, the dashboard visualization allows a user to identify what next steps with respect to assets will provide an optimal return on investment for the action (e.g., repair device #1 vs. device #2) depending on the metrics (e.g., fixing device #1 will save X % energy, whereas repairing device #2 will save $Y). In one or more embodiments, the dashboard visualization allows a user to view individual assets through the dashboard (e.g., boiler #1 is operating at 90% efficiency, or will fail in X weeks, Y days, Z hours unless action is taken; and repairing the boiler #1 within a first interval of time will save $X, whereas repairing within a second interval of time will save $Y). In one or more embodiments, the dashboard visualization allows a user to change individual settings for an asset remotely. In one or more embodiments, the dashboard visualization notifies a user that changing settings for an asset from X to Y will save X % energy or $Y.

As such, by employing one or more techniques disclosed herein, asset performance is optimized. Moreover, by employing one or more techniques disclosed herein, improved insights for opportunity and/or performance insights for assets is provided to a user via improved visual indicators associated with a graphical user interface. For instance, by employing one or more techniques disclosed herein, additional and/or improved asset insights as compared to capabilities of conventional techniques can be achieved across a data set. Additionally, performance of a processing system associated with data analytics is improved by employing one or more techniques disclosed herein. For example, a number of computing resources, a number of a storage requirements, and/or number of errors associated with data analytics is reduced by employing one or more techniques disclosed herein.

FIG. 1 illustrates an exemplary networked computing system environment 100, according to the present disclosure. As shown in FIG. 1, networked computing system environment 100 is organized into a plurality of layers including a cloud layer 105, a network layer 110, and an edge layer 115. As detailed further below, components of the edge 115 are in communication with components of the cloud 105 via network 110.

In various embodiments, network 110 is any suitable network or combination of networks and supports any appropriate protocol suitable for communication of data to and from components of the cloud 105 and between various other components in the networked computing system environment 100 (e.g., components of the edge 115). According to various embodiments, network 110 includes a public network (e.g., the Internet), a private network (e.g., a network within an organization), or a combination of public and/or private networks. According to various embodiments, network 110 is configured to provide communication between various components depicted in FIG. 1. According to various embodiments, network 110 comprises one or more networks that connect devices and/or components in the network layout to allow communication between the devices and/or components. For example, in one or more embodiments, the network 110 is implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 is implemented using cellular networks, satellite, licensed radio, or a combination of cellular, satellite, licensed radio, and/or unlicensed radio networks.

Components of the cloud 105 include one or more computer systems 120 that form a so-called "Internet-of-Things" or "IoT" platform 125. It should be appreciated that "IoT platform" is an optional term describing a platform connecting any type of Internet-connected device, and should not be construed as limiting on the types of computing systems useable within IoT platform 125. In particular, in various embodiments, computer systems 120 includes any type or quantity of one or more processors and one or more data storage devices comprising memory for storing and executing applications or software modules of networked computing system environment 100. In one embodiment, the processors and data storage devices are embodied in server-class hardware, such as enterprise-level servers. For example, in an embodiment, the processors and data storage devices comprise any type or combination of application servers, communication servers, web servers, super-computing servers, database servers, file servers, mail servers, proxy servers, and/virtual servers. Further, the one or more processors are configured to access the memory and execute processor-readable instructions, which when executed by the processors configures the processors to perform a plurality of functions of the networked computing system environment 100.

Computer systems 120 further include one or more software components of the IoT platform 125. For example, in one or more embodiments, the software components of computer systems 120 include one or more software modules to communicate with user devices and/or other computing devices through network 110. For example, in one or more embodiments, the software components include one or more modules 141, models 142, engines 143, databases 144, services 145, and/or applications 146, which may be stored in/by the computer systems 120 (e.g., stored on the memory), as detailed with respect to FIG. 2 below. According to various embodiments, the one or more processors are configured to utilize the one or more modules 141, models 142, engines 143, databases 144, services 145, and/or applications 146 when performing various methods described in this disclosure.

Accordingly, in one or more embodiments, computer systems 120 execute a cloud computing platform (e.g., IoT platform 125) with scalable resources for computation and/or data storage, and may run one or more applications on the cloud computing platform to perform various computer-implemented methods described in this disclosure. In some embodiments, some of the modules 141, models 142, engines 143, databases 144, services 145, and/or applications 146 are combined to form fewer modules, models, engines, databases, services, and/or applications. In some embodiments, some of the modules 141, models 142, engines 143, databases 144, services 145, and/or applications 146 are separated into separate, more numerous modules, models, engines, databases, services, and/or applications. In some embodiments, some of the modules 141, models 142, engines 143, databases 144, services 145, and/or applications 146 are removed while others are added.

The computer systems 120 are configured to receive data from other components (e.g., components of the edge 115) of networked computing system environment 100 via network 110. Computer systems 120 are further configured to utilize the received data to produce a result. According to various embodiments, information indicating the result is transmitted to users via user computing devices over network 110. In some embodiments, the computer systems 120 is a server system that provides one or more services including providing the information indicating the received data and/or the result(s) to the users. According to various embodiments, computer systems 120 are part of an entity which include any type of company, organization, or institution that implements one or more IoT services. In some examples, the entity is an IoT platform provider.

Components of the edge 115 include one or more enterprises 160a-160n each including one or more edge devices 161a-161n and one or more edge gateways 162a-162n. For example, a first enterprise 160a includes first edge devices 161a and first edge gateways 162a, a second enterprise 160b includes second edge devices 161b and second edge gateways 162b, and an nth enterprise 160n includes nth edge devices 161n and nth edge gateways 162n. As used herein, enterprises 160a-160n represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or entity that includes any number of local devices.

Figure 2:
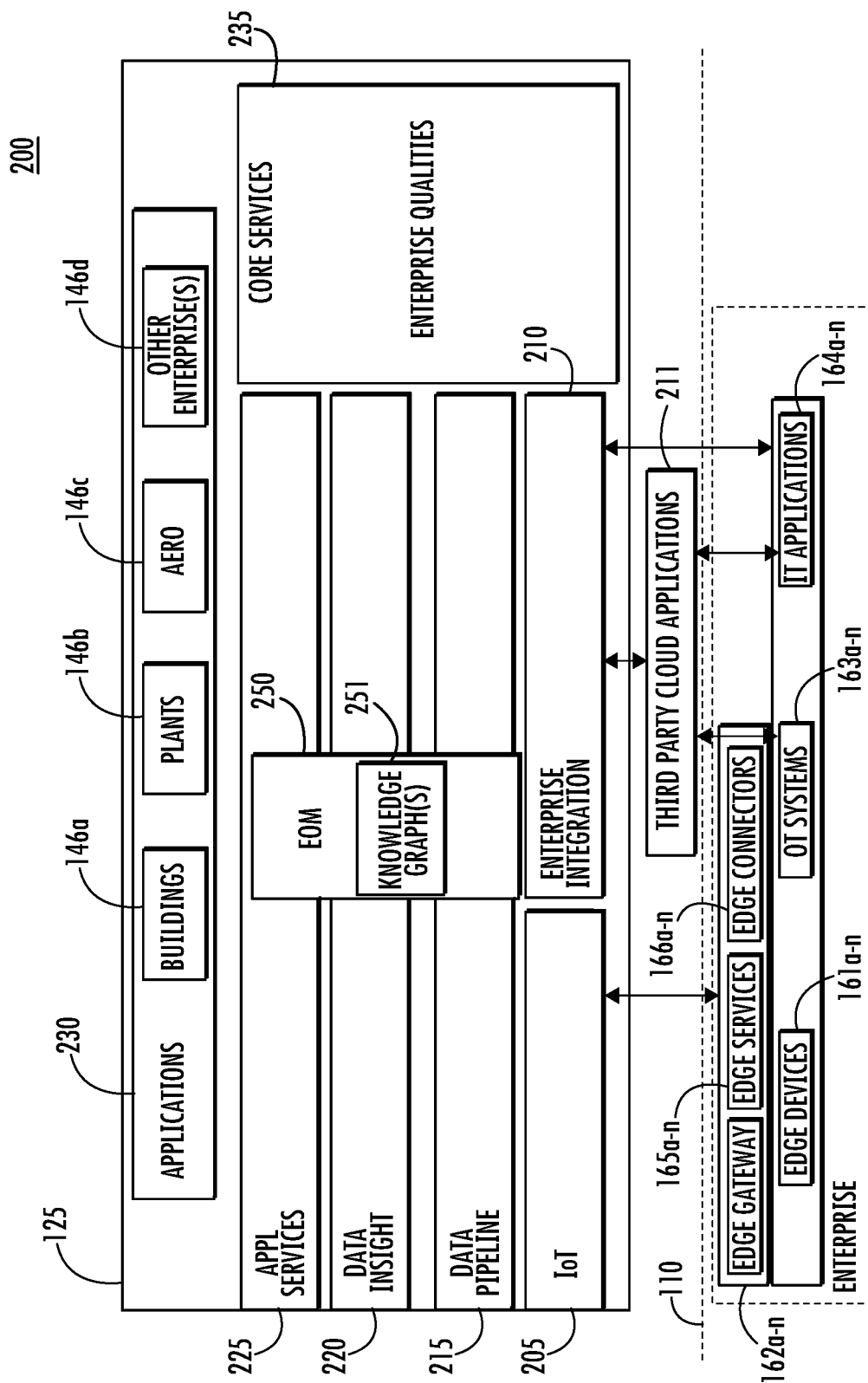
FIG. 2 illustrates a schematic block diagram of a framework of an IoT platform of the networked computing system, in accordance with one or more embodiments described herein.

According to various embodiments, the edge devices 161a-161n represent any of a variety of different types of devices that may be found within the enterprises 160a-160n. Edge devices 161a-161n are any type of device configured to access network 110, or be accessed by other devices through network 110, such as via an edge gateway 162a-162n. According to various embodiments, edge devices 161a-161n are "IoT devices" which include any type of network-connected (e.g., Internet-connected) device. For example, in one or more embodiments, the edge devices 161a-161n include assets, sensors, actuators, processors, computers, valves, pumps, ducts, vehicle components, cameras, displays, doors, windows, security components, boilers, chillers, pumps, air handler units, HVAC components, factory equipment, and/or any other devices that are connected to the network 110 for collecting, sending, and/or receiving information. Each edge device 161a-161n includes, or is otherwise in communication with, one or more controllers for selectively controlling a respective edge device 161a-161n and/or for sending/receiving information between the edge devices 161a-161n and the cloud 105 via network 110. With reference to FIG. 2, in one or more embodiments, the edge 115 include operational technology (OT) systems 163a-163n and information technology (IT) applications 164a-164n of each enterprise 161a-161n. The OT systems 163a-163n include hardware and software for detecting and/or causing a change, through the direct monitoring and/or control of industrial equipment (e.g., edge devices 161a-161n), assets, processes, and/or events. The IT applications 164a-164n includes network, storage, and computing resources for the generation, management, storage, and delivery of data throughout and between organizations.

The edge gateways 162a-162n include devices for facilitating communication between the edge devices 161a-161n and the cloud 105 via network 110. For example, the edge gateways 162a-162n include one or more communication interfaces for communicating with the edge devices 161a-161n and for communicating with the cloud 105 via network 110. According to various embodiments, the communication interfaces of the edge gateways 162a-162n include one or more cellular radios, Bluetooth, WiFi, near-field communication radios, Ethernet, or other appropriate communication devices for transmitting and receiving information. According to various embodiments, multiple communication interfaces are included in each gateway 162a-162n for providing multiple forms of communication between the edge devices 161a-161n, the gateways 162a-162n, and the cloud 105 via network 110. For example, in one or more embodiments, communication are achieved with the edge devices 161a-161n and/or the network 110 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

According to various embodiments, the edge gateways 162a-162n also include a processor and memory for storing and executing program instructions to facilitate data processing. For example, in one or more embodiments, the edge gateways 162a-162n are configured to receive data from the edge devices 161a-161n and process the data prior to sending the data to the cloud 105. Accordingly, in one or more embodiments, the edge gateways 162a-162n include one or more software modules or components for providing data processing services and/or other services or methods of the present disclosure. With reference to FIG. 2, each edge gateway 162a-162n includes edge services 165a-165n and edge connectors 166a-166n. According to various embodiments, the edge services 165a-165n include hardware and software components for processing the data from the edge devices 161a-161n. According to various embodiments, the edge connectors 166a-166n include hardware and software components for facilitating communication between the edge gateway 162a-162n and the cloud 105 via network 110, as detailed above. In some cases, any of edge devices 161a-n, edge connectors 166a-n, and edge gateways 162a-n have their functionality combined, omitted, or separated into any combination of devices. In other words, an edge device and its connector and gateway need not necessarily be discrete devices.

FIG. 2 illustrates a schematic block diagram of framework 200 of the IoT platform 125, according to the present disclosure. The IoT platform 125 of the present disclosure is a platform for enterprise performance management that uses real-time accurate models and visual analytics to deliver intelligent actionable recommendations and/or analytics for sustained peak performance of the enterprise 160a-160n. The IoT platform 125 is an extensible platform that is portable for deployment in any cloud or data center environment for providing an enterprise-wide, top to bottom view, displaying the status of processes, assets, people, and safety. Further, the IoT platform 125 supports end-to-end capability to execute digital twins against process data and to translate the output into actionable insights, using the framework 200, detailed further below.

As shown in FIG. 2, the framework 200 of the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, in one or more embodiments, each layer 205-235 includes one or more of the modules 141, models 142, engines 143, databases 144, services 145, applications 146, or combinations thereof. In some embodiments, the layers 205-235 are combined to form fewer layers. In some embodiments, some of the layers 205-235 are separated into separate, more numerous layers. In some embodiments, some of the layers 205-235 are removed while others may be added.

The IoT platform 125 is a model-driven architecture. Thus, the extensible object model 250 communicates with each layer 205-230 to contextualize site data of the enterprise 160a-160n using an extensible graph-based object model (or "asset model"). In one or more embodiments, the extensible object model 250 is associated with knowledge graphs 251 where the equipment (e.g., edge devices 161a-161n) and processes of the enterprise 160a-160n are modeled. The knowledge graphs 251 of EOM 250 are configured to store the models in a central location. The knowledge graphs 251 define a collection of nodes and links that describe real-world connections that enable smart systems. As used herein, a knowledge graph 251: (i) describes real-world entities (e.g., edge devices 161a-161n) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161a-161n), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 include resource description framework (RDF) graphs. As used herein, a "RDF graph" is a graph data model that formally describes the semantics, or meaning, of information. The RDF graph also represents metadata (e.g., data that describes data). According to various embodiments, knowledge graphs 251 also include a semantic object model. The semantic object model is a subset of a knowledge graph 251 that defines semantics for the knowledge graph 251. For example, the semantic object model defines the schema for the knowledge graph 251.

As used herein, EOM 250 includes a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161a-161n of an enterprise 160a-160n, and the knowledge graphs 251 are input into the EOM 250 for visualizing the models (e.g., the nodes and links).

The models describe the assets (e.g., the nodes) of an enterprise (e.g., the edge devices 161a-161n) and describe the relationship of the assets with other components (e.g., the links). The models also describe the schema (e.g., describe what the data is), and therefore the models are self-validating. For example, in one or more embodiments, the model describes the type of sensors mounted on any given asset (e.g., edge device 161a-161n) and the type of data that is being sensed by each sensor. According to various embodiments, a KPI framework is used to bind properties of the assets in the extensible object model 250 to inputs of the KPI framework. Accordingly, the IoT platform 125 is an extensible, model-driven end-to-end stack including: two-way model sync and secure data exchange between the edge 115 and the cloud 105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161a-161n and the applications 146 that handle those devices 161a-161n. For example, when new edge devices 161a-161n are added to an enterprise 160a-160n system, the new devices 161a-161n will automatically appear in the IoT platform 125 so that the corresponding applications 146 understand and use the data from the new devices 161a-161n.

In some cases, asset templates are used to facilitate configuration of instances of edge devices 161a-161n in the model using common structures. An asset template defines the typical properties for the edge devices 161a-161n of a given enterprise 160a-160n for a certain type of device. For example, an asset template of a pump includes modeling the pump having inlet and outlet pressures, speed, flow, etc. The templates may also include hierarchical or derived types of edge devices 161a-161n to accommodate variations of a base type of device 161a-161n. For example, a reciprocating pump is a specialization of a base pump type and would include additional properties in the template. Instances of the edge device 161a-161n in the model are configured to match the actual, physical devices of the enterprise 160a-160n using the templates to define expected attributes of the device 161a-161n. Each attribute is configured either as a static value (e.g., capacity is 1000 BPH) or with a reference to a time series tag that provides the value. The knowledge graph 250 can automatically map the tag to the attribute based on naming conventions, parsing, and matching the tag and attribute descriptions and/or by comparing the behavior of the time series data with expected behavior. In one or more embodiments, each of the key attribute contributing to one or more metrics to drive a dashboard is marked with one or more metric tags such that a dashboard visualization is generated.

The modeling phase includes an onboarding process for syncing the models between the edge 115 and the cloud 105. For example, in one or more embodiments, the onboarding process includes a simple onboarding process, a complex onboarding process, and/or a standardized rollout process. The simple onboarding process includes the knowledge graph 250 receiving raw model data from the edge 115 and running context discovery algorithms to generate the model. The context discovery algorithms read the context of the edge naming conventions of the edge devices 161a-161n and determine what the naming conventions refer to. For example, in one or more embodiments, the knowledge graph 250 receives "TMP" during the modeling phase and determine that "TMP" relates to "temperature." The generated models are then published. The complex onboarding process includes the knowledge graph 250 receiving the raw model data, receiving point history data, and receiving site survey data. According to various embodiments, the knowledge graph 250 then uses these inputs to run the context discovery algorithms. According to various embodiments, the generated models are edited and then the models are published. The standardized rollout process includes manually defining standard models in the cloud 105 and pushing the models to the edge 115.

The IoT layer 205 includes one or more components for device management, data ingest, and/or command/control of the edge devices 161a-161n. The components of the IoT layer 205 enable data to be ingested into, or otherwise received at, the IoT platform 125 from a variety of sources. For example, in one or more embodiments, data is ingested from the edge devices 161a-161n through process historians or laboratory information management systems. The IoT layer 205 is in communication with the edge connectors 165a-165n installed on the edge gateways 162a-162n through network 110, and the edge connectors 165a-165n send the data securely to the IoT platform 205. In some embodiments, only authorized data is sent to the IoT platform 125, and the IoT platform 125 only accepts data from authorized edge gateways 162a-162n and/or edge devices 161a-161n. According to various embodiments, data is sent from the edge gateways 162a-162n to the IoT platform 125 via direct streaming and/or via batch delivery. Further, after any network or system outage, data transfer will resume once communication is re-established and any data missed during the outage will be backfilled from the source system or from a cache of the IoT platform 125. According to various embodiments, the IoT layer 205 also includes components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any application(s) operated by an enterprise in relation to its edge devices. For example, the enterprise integration layer 210 connects with enterprise databases, such as guest databases, customer databases, financial databases, patient databases, etc. The enterprise integration layer 210 provides a standard application programming interface (API) to third parties for accessing the IoT platform 125. The enterprise integration layer 210 also enables the IoT platform 125 to communicate with the OT systems 163a-163n and IT applications 164a-164n of the enterprise 160a-160n. Thus, the enterprise integration layer 210 enables the IoT platform 125 to receive data from the third-party applications 211 rather than, or in combination with, receiving the data from the edge devices 161a-161n directly.

The data pipeline layer 215 includes one or more components for data cleansing/enriching, data transformation, data calculations/aggregations, and/or API for data streams. Accordingly, in one or more embodiments, the data pipeline layer 215 pre-processes and/or performs initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, cleansed data is run through enterprise-specific digital twins. According to various embodiments, the enterprise-specific digital twins include a reliability advisor containing process models to determine the current operation and the fault models to trigger any early detection and determine an appropriate resolution. According to various embodiments, the digital twins also include an optimization advisor that integrates real-time economic data with real-time process data, selects the right feed for a process, and determines optimal process conditions and product yields.

According to various embodiments, the data pipeline layer 215 employs models and templates to define calculations and analytics. Additionally or alternatively, according to various embodiments, the data pipeline layer 215 employs models and templates to define how the calculations and analytics relate to the assets (e.g., the edge devices 161a-161n). For example, in an embodiment, a pump template defines pump efficiency calculations such that every time a pump is configured, the standard efficiency calculation is automatically executed for the pump. The calculation model defines the various types of calculations, the type of engine that should run the calculations, the input and output parameters, the preprocessing requirement and prerequisites, the schedule, etc. According to various embodiments, the actual calculation or analytic logic is defined in the template or it may be referenced. Thus, according to various embodiments, the calculation model is employed to describe and control the execution of a variety of different process models. According to various embodiments, calculation templates are linked with the asset templates such that when an asset (e.g., edge device 161a-161n) instance is created, any associated calculation instances are also created with their input and output parameters linked to the appropriate attributes of the asset (e.g., edge device 161a-161n).

According to various embodiments, the IoT platform 125 supports a variety of different analytics models including, for example, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160a-160n performance to identify issues or opportunities, and the potential causes or drivers of the issues or opportunities. The IoT platform 125 includes rich hierarchical symptom-fault models to identify abnormal conditions and their potential consequences. For example, in one or more embodiments, the IoT platform 125 drill downs from a high-level condition to understand the contributing factors, as well as determining the potential impact a lower level condition may have. There may be multiple fault models for a given enterprise 160a-160n looking at different aspects such as process, equipment, control, and/or operations. According to various embodiments, each fault model identifies issues and opportunities in their domain, and can also look at the same core problem from a different perspective. According to various embodiments, an overall fault model is layered on top to synthesize the different perspectives from each fault model into an overall assessment of the situation and point to the true root cause.

According to various embodiments, when a fault or opportunity is identified, the IoT platform 125 provides recommendations about an optimal corrective action to take. Initially, the recommendations are based on expert knowledge that has been pre-programmed into the system by process and equipment experts. A recommendation services module presents this information in a consistent way regardless of source, and supports workflows to track, close out, and document the recommendation follow-up. According to various embodiments, the recommendation follow-up is employed to improve the overall knowledge of the system over time as existing recommendations are validated (or not) or new cause and effect relationships are learned by users and/or analytics.

According to various embodiments, the models are used to accurately predict what will occur before it occurs and interpret the status of the installed base. Thus, the IoT platform 125 enables operators to quickly initiate maintenance measures when irregularities occur. According to various embodiments, the digital twin architecture of the IoT platform 125 employs a variety of modeling techniques. According to various embodiments, the modeling techniques include, for example, rigorous models, fault detection and diagnostics (FDD), descriptive models, predictive maintenance, prescriptive maintenance, process optimization, and/or any other modeling technique.

According to various embodiments, the rigorous models are converted from process design simulation. In this manner, process design is integrated with feed conditions and production requirement. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. According to various embodiments, the descriptive models identifies a problem and the predictive models determines possible damage levels and maintenance options. According to various embodiments, the descriptive models include models for defining the operating windows for the edge devices 161a-161n.

Predictive maintenance includes predictive analytics models developed based on rigorous models and statistic models, such as, for example, principal component analysis (PCA) and partial least square (PLS). According to various embodiments, machine learning methods are applied to train models for fault prediction. According to various embodiments, predictive maintenance leverages FDD-based algorithms to continuously monitor individual control and equipment performance. Predictive modeling is then applied to a selected condition indicator that deteriorates in time. Prescriptive maintenance includes determining an optimal maintenance option and when it should be performed based on actual conditions rather than time-based maintenance schedule. According to various embodiments, prescriptive analysis selects the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TDSB), relational/document databases, data lakes, blob, files, images, and videos, and/or an API for data query. According to various embodiments, when raw data is received at the IoT platform 125, the raw data is stored as time series tags or events in warm storage (e.g., in a TSDB) to support interactive queries and to cold storage for archive purposes. According to various embodiments, data is sent to the data lakes for offline analytics development. According to various embodiments, the data pipeline layer 215 accesses the data stored in the databases of the data insight layer 220 to perform analytics, as detailed above.

The application services layer 225 includes one or more components for rules engines, workflow/notifications, KPI framework, insights (e.g., actionable insights), decisions, recommendations, machine learning, and/or an API for application services. The application services layer 225 enables building of applications 146a-d. The applications layer 230 includes one or more applications 146a-d of the IoT platform 125. For example, according to various embodiments, the applications 146a-d includes a buildings application 146a, a plants application 146b, an aero application 146c, and other enterprise applications 146d. According to various embodiments, the applications 146 includes general applications 146 for portfolio management, asset management, autonomous control, and/or any other custom applications. According to various embodiments, portfolio management includes the KPI framework and a flexible user interface (UI) builder. According to various embodiments, asset management includes asset performance and asset health. According to various embodiments, autonomous control includes energy optimization and/or predictive maintenance. As detailed above, according to various embodiments, the general applications 146 is extensible such that each application 146 is configurable for the different types of enterprises 160a-160n (e.g., buildings application 146a, plants application 146b, aero application 146c, and other enterprise applications 146d).

The applications layer 230 also enables visualization of performance of the enterprise 160a-160n. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. According to various embodiments, the core services 235 include data visualization, data analytics tools, security, scaling, and monitoring. According to various embodiments, the core services 235 also include services for tenant provisioning, single login/common portal, self-service admin, UI library/UI tiles, identity/access/entitlements, logging/monitoring, usage metering, API gateway/dev portal, and the IoT platform 125 streams.

Figure 3:
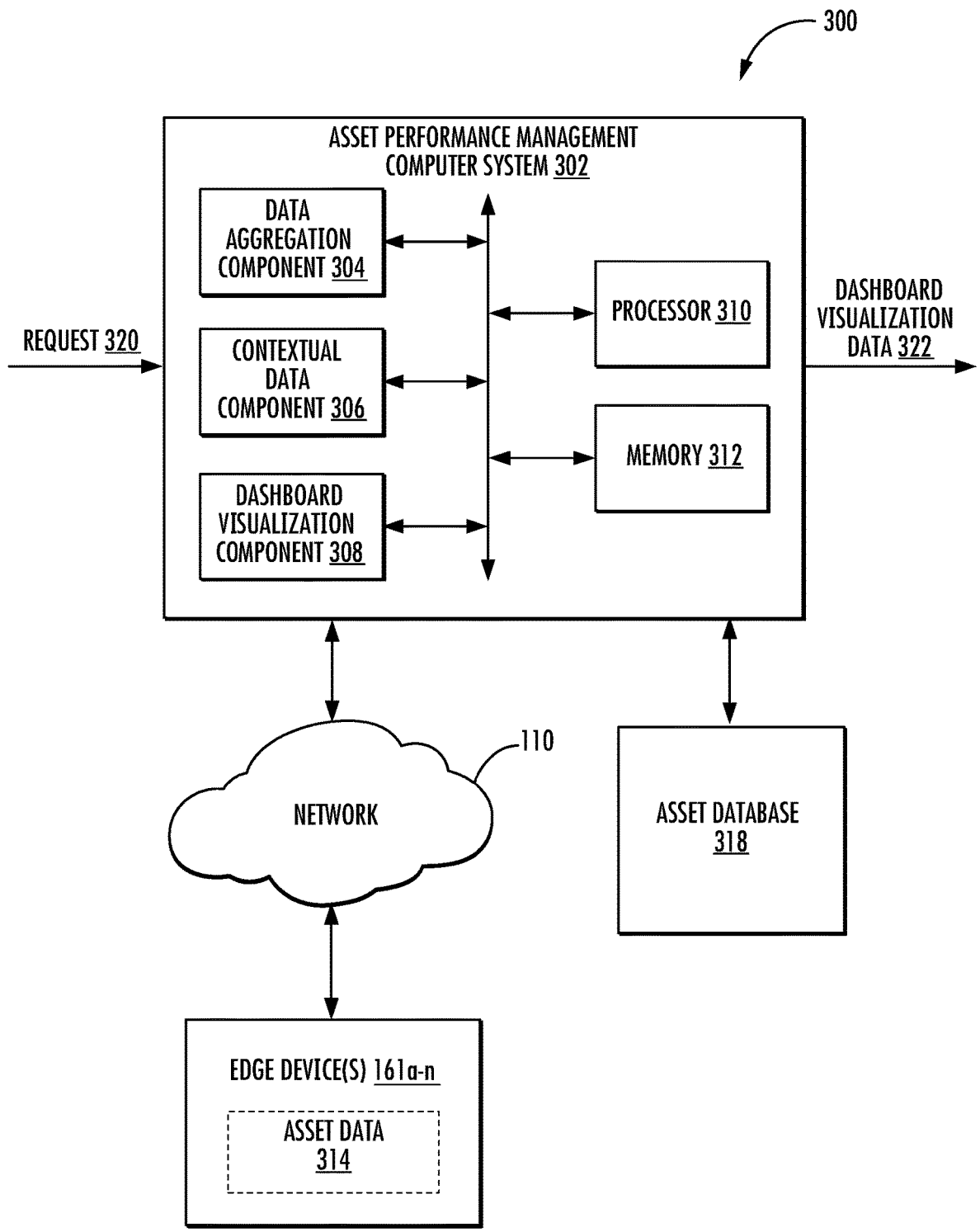
FIG. 3 illustrates a system that provides an exemplary environment, in accordance with one or more embodiments described herein.

FIG. 3 illustrates a system 300 that provides an exemplary environment according to one or more described features of one or more embodiments of the disclosure. According to an embodiment, the system 300 includes an asset performance management computer system 302 to facilitate a practical application of data analytics technology and/or digital transformation technology to provide optimization related to enterprise performance management. In one or more embodiments, the asset performance management computer system 302 facilitates a practical application of metrics modeling related to dashboard technology to provide optimization related to enterprise performance management. In one or more embodiments, the asset performance management computer system 302 stores and/or analyzes data that is aggregated from one or more assets and/or one or more data sources associated with an enterprise system (e.g., a building system, an industrial system or another type of enterprise system).

In an embodiment, the asset performance management computer system 302 is a server system (e.g., a server device) that facilitates a data analytics platform between one or more computing devices, one or more data sources, and/or one or more assets. In one or more embodiments, the asset performance management computer system 302 is a device with one or more processors and a memory. In one or more embodiments, the asset performance management computer system 302 is a computer system from the computer systems 120. For example, in one or more embodiments, the asset performance management computer system 302 is implemented via the cloud 105. The asset performance management computer system 302 is also related to one or more technologies, such as, for example, enterprise technologies, connected building technologies, industrial technologies, Internet of Things (IoT) technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, industrial technologies, cybersecurity technologies, navigation technologies, asset visualization technologies, oil and gas technologies, petrochemical technologies, refinery technologies, process plant technologies, procurement technologies, and/or one or more other technologies.

Moreover, the asset performance management computer system 302 provides an improvement to one or more technologies such as enterprise technologies, connected building technologies, industrial technologies, IoT technologies, data analytics technologies, digital transformation technologies, cloud computing technologies, cloud database technologies, server technologies, network technologies, private enterprise network technologies, wireless communication technologies, machine learning technologies, artificial intelligence technologies, digital processing technologies, electronic device technologies, computer technologies, supply chain analytics technologies, aircraft technologies, industrial technologies, cybersecurity technologies, navigation technologies, asset visualization technologies, oil and gas technologies, petrochemical technologies, refinery technologies, process plant technologies, procurement technologies, and/or one or more other technologies. In an implementation, the asset performance management computer system 302 improves performance of a computing device. For example, in one or more embodiments, the asset performance management computer system 302 improves processing efficiency of a computing device (e.g., a server), reduces power consumption of a computing device (e.g., a server), improves quality of data provided by a computing device (e.g., a server), etc.

The asset performance management computer system 302 includes a data aggregation component 304, a contextual data component 306 and/or a dashboard visualization component 308. Additionally, in one or more embodiments, the asset performance management computer system 302 includes a processor 310 and/or a memory 312. In certain embodiments, one or more aspects of the asset performance management computer system 302 (and/or other systems, apparatuses and/or processes disclosed herein) constitute executable instructions embodied within a computer-readable storage medium (e.g., the memory 312). For instance, in an embodiment, the memory 312 stores computer executable component and/or executable instructions (e.g., program instructions). Furthermore, the processor 310 facilitates execution of the computer executable components and/or the executable instructions (e.g., the program instructions). In an example embodiment, the processor 310 is configured to execute instructions stored in the memory 312 or otherwise accessible to the processor 310.

The processor 310 is a hardware entity (e.g., physically embodied in circuitry) capable of performing operations according to one or more embodiments of the disclosure. Alternatively, in an embodiment where the processor 310 is embodied as an executor of software instructions, the software instructions configure the processor 310 to perform one or more algorithms and/or operations described herein in response to the software instructions being executed. In an embodiment, the processor 310 is a single core processor, a multi-core processor, multiple processors internal to the asset performance management computer system 302, a remote processor (e.g., a processor implemented on a server), and/or a virtual machine. In certain embodiments, the processor 310 is in communication with the memory 312, the data aggregation component 304, the contextual data component 306 and/or the dashboard visualization component 308 via a bus to, for example, facilitate transmission of data among the processor 310, the memory 312, the data aggregation component 304, the contextual data component 306 and/or the dashboard visualization component 308. The processor 310 may be embodied in a number of different ways and, in certain embodiments, includes one or more processing devices configured to perform independently. Additionally or alternatively, in one or more embodiments, the processor 310 includes one or more processors configured in tandem via a bus to enable independent execution of instructions, pipelining of data, and/or multi-thread execution of instructions.

The memory 312 is non-transitory and includes, for example, one or more volatile memories and/or one or more non-volatile memories. In other words, in one or more embodiments, the memory 312 is an electronic storage device (e.g., a computer-readable storage medium). The memory 312 is configured to store information, data, content, one or more applications, one or more instructions, or the like, to enable the asset performance management computer system 302 to carry out various functions in accordance with one or more embodiments disclosed herein. As used herein in this disclosure, the term "component," "system," and the like, is a computer-related entity. For instance, "a component," "a system," and the like disclosed herein is either hardware, software, or a combination of hardware and software. As an example, a component is, but is not limited to, a process executed on a processor, a processor, circuitry, an executable component, a thread of instructions, a program, and/or a computer entity.

In an embodiment, the asset performance management computer system 302 (e.g., the data aggregation component 304 of the asset performance management computer system 302) receives asset data 314 from the edge devices 161*a*-161*n*. In one or more embodiments, the edge devices 161*a*-161*n* are associated with a portfolio of assets. For instance, in one or more embodiments, the edge devices 161*a*-161*n* include one or more assets in a portfolio of assets. The edge devices 161*a*-161*n* include, in one or more embodiments, one or more databases, one or more assets (e.g., one or more building assets, one or more industrial assets, etc.), one or more IoT devices (e.g., one or more industrial IoT devices), one or more connected building assets, one or more sensors, one or more actuators, one or more processors, one or more computers, one or more valves, one or more pumps (e.g., one or more centrifugal pumps, etc.), one or more motors, one or more compressors, one or more turbines, one or more ducts, one or more heaters, one or more chillers, one or more coolers, one or more boilers, one or more furnaces, one or more heat exchangers, one or more fans, one or more blowers, one or more conveyor belts, one or more vehicle components, one or more cameras, one or more displays, one or more security components, one or more air handler units, one or more HVAC components, industrial equipment, factory equipment, and/or one or more other devices that are connected to the network 110 for collecting, sending, and/or receiving information. In one or more embodiments, the edge device 161a-161n include, or is otherwise in communication with, one or more controllers for selectively controlling a respective edge device 161a-161n and/or for sending/receiving information between the edge devices 161a-161n and the asset performance management computer system 302 via the network 110. The asset data 314 includes, for example, connected building data, sensor data, real-time data, live property value data, event data, process data, operational data, fault data, asset data, location data, and/or other data associated with the edge devices 161a-161n. Additionally or alternatively, the asset data 314 includes historical data, historical connected building data, historical sensor data, historical property value data, historical event data, historical process data, historical operational data, historical fault data, historical asset data, and/or other historical data associated with the edge devices 161a-161n.

In certain embodiments, the portfolio of assets is a portfolio of SCADA systems. A SCADA system is a control system that includes one or more assets configured for networked communications and/or real-time control logic. For example, a SCADA system is configured for data acquisition, networked data communication, data presentation, monitoring, and/or control of one or more assets. In certain embodiments, a SCADA system is configured with one or more graphical user interfaces (e.g., one or more human machine interfaces) to facilitate management of the one or more systems. In certain embodiments, a SCADA system includes one or more controllers (e.g., one or more programmable logic controllers, one or more remote terminal units, one or more proportional integral derivative controllers, etc.) to facilitate control of the one or more assets. In certain embodiments, one or more events of a SCADA system stored in one or more log files. In certain embodiments, a SCADA system is associated with a location. In certain embodiments, the enterprise 160a is a first SCADA system, the enterprise 160b is a second SCADA system, etc.

In certain embodiments, at least one edge device from the edge devices 161a-161n incorporates encryption capabilities to facilitate encryption of one or more portions of the asset data 314. Additionally, in one or more embodiments, the asset performance management computer system 302 (e.g., the data aggregation component 304 of the asset performance management computer system 302) receives the asset data 314 via the network 110. In one or more embodiments, the network 110 is a Wi-Fi network, a Near Field Communications (NFC) network, a Worldwide Interoperability for Microwave Access (WiMAX) network, a personal area network (PAN), a short-range wireless network (e.g., a Bluetooth® network), an infrared wireless (e.g., IrDA) network, an ultra-wideband (UWB) network, an induction wireless transmission network, and/or another type of network. In one or more embodiments, the edge devices 161a-161n are associated with an industrial environment (e.g., a plant, etc.). Additionally or alternatively, in one or more embodiments, the edge devices 161a-161n are associated with components of the edge 115 such as, for example, one or more enterprises 160a-160n.

In one or more embodiments, the data aggregation component 304 aggregates the asset data 314 from the edge devices 161a-161n. For instance, in one or more embodiments, the data aggregation component 304 can aggregate the asset data 314 into an asset database 318. The asset database 318 is a cache memory (e.g., a database structure) that dynamically stores the asset data 314 based on interval of time and/or asset hierarchy level. For instance, in one or more embodiments, the asset database 318 stores the asset data 314 for one or more intervals of time (e.g., 1 minute to 12 minutes, 1 hour to 24 hours, 1 day to 31 days, 1 month to 12 months, etc.) and/or for one or more asset hierarchy levels (e.g., asset level, asset zone, building level, building zone, plant level, plant zone, industrial site level, etc.). In a non-limiting embodiment, the asset database 318 stores the asset data 314 for a first interval of time (e.g., 1 hour to 24 hours minutes) for a first asset (e.g., a first asset hierarchy level), for a second interval of time (e.g., 1 day to 31 days) for the first asset, and for a third interval of time (e.g., 1 month to 12 months) for the first asset. Furthermore, in the non-limiting embodiment, the asset database 318 stores the asset data 314 for the first interval of time (e.g., 1 hour to 24 hours minutes) for all assets in a connected building (e.g., a second asset hierarchy level), for the second interval of time (e.g., 1 day to 31 days) for all the assets in the connected building, and for the third interval of time (e.g., 1 month to 12 months) for the all the assets in the connected building. In the non-limiting embodiment, the asset database 318 also stores the asset data 314 for the first interval of time (e.g., 1 hour to 24 hours minutes) for all connected buildings within a particular geographic region (e.g., a third asset hierarchy level), for the second interval of time (e.g., 1 day to 31 days) for all connected buildings within the particular geographic region, and for the third interval of time (e.g., 1 month to 12 months) for all connected buildings within the particular geographic region.

In one or more embodiments, the data aggregation component 304 repeatedly updates data of the asset database 318 based on the asset data 314 provided by the edge devices 161a-161n during the one or more intervals of time associated with the asset database 318. For instance, in one or more embodiments, the data aggregation component 304 stores new data and/or modified data associated with the asset data 314. In one or more embodiments, the data aggregation component 304 repeatedly scans the edge devices 161a-161n to determine new data for storage in the asset database 318. In one or more embodiments, the data aggregation component 304 formats one or more portions of the asset data 314. For instance, in one or more embodiments, the data aggregation component 304 provides a formatted version of the asset data 314 to the asset database 318. In an embodiment, the formatted version of the asset data 314 is formatted with one or more defined formats associated with the one or more intervals of time and/or the one or more asset hierarchy levels. A defined format is, for example, a structure for data fields of the asset database 318. In various embodiments, the formatted version of the asset data 314 is stored in the asset database 318.

In one or more embodiments, the data aggregation component 304 identifies and/or groups data types associated with the asset data 314 based on the one or more intervals of time (e.g., one or more reporting intervals of time) and/or the one or more asset hierarchy levels. In one or more embodiments, the data aggregation component 304 employs batching, concatenation of the asset data 314, identification of data types, merging of the asset data 314, grouping of the asset data 314, reading of the asset data 314 and/or writing of the asset data 314 to facilitate storage of the asset data 314 within the asset database 318. In one or more embodiments, the data aggregation component 304 groups data from the asset data 314 based on corresponding features and/or attributes of the data. In one or more embodiments, the data aggregation component 304 groups data from the asset data 314 based on corresponding identifiers (e.g., a matching asset hierarchy level, a matching asset, a matching connected building, etc.) for the asset data 314. In one or more embodiments, the data aggregation component 304 employs one or more locality-sensitive hashing techniques to group data from the asset data 314 based on similarity scores and/or calculated distances between different data in the asset data 314.

In one or more embodiments, the data aggregation component 304 organizes the formatted version of the asset data 314 based on a time series mapping of attributes for the asset data 314. For instance, in one or more embodiments, the data aggregation component 304 employs a hierarchical data format technique to organize the formatted version of the asset data 314 in the asset database 318. In one or more embodiments, the asset database 318 dynamically stores data (e.g., one or more portions of the asset data 314) based on type of data presented via a dashboard visualization. In one or more embodiments, data (e.g., one or more portions of the asset data 314) aggregated from the edge devices 161a-161n is converted into one or more metrics (e.g., a KPI metric, a duty KPI, a duty target KPI) prior to being stored in the asset database 318. In one or more embodiments, a metric (e.g. a KP metrics) consists of aspect data indicative of an aspect employed in a model to map an attribute to the metric (e.g., an operating power asset type attribute is mapped to a duty aspect, etc.), aggregation data indicative of information related to aggregation across time, rollup data indicative of an aggregate metric of an asset across an asset at one level as well as across a hierarchy asset, low limit data indicative of a low-limit constant derived from a digital twin model in real-time, high limit data indicative of a high-limit constant derived from a digital twin model in real-time, target data indicative of a target constant derived from a digital twin model in real-time, custom calculation data indicative of information related to custom calculations using aggregate data across time or asset, and/or other data related to the metric.

In one or more embodiments, the asset performance management computer system 302 (e.g., the contextual data component 306 of the asset performance management computer system 302) receives a request 320. In an embodiment, the request 320 is a request to generate a dashboard visualization associated with a portfolio of assets. For instance, in one or more embodiments, the request 320 is a request to generate a dashboard visualization associated with the edge devices 161a-161n (e.g., the edge devices 161a-161n included in a portfolio of assets).

In one or more embodiments, the request 320 includes one or more asset descriptors that describe one or more assets in the portfolio of assets. For instance, in one or more embodiments, the request 320 includes one or more asset descriptors that describe the edge devices 161a-161n. An asset descriptor includes, for example, an asset name, an asset identifier, an asset level and/or other information associated with an asset. In certain embodiments, the asset descriptor is a SCADA system descriptor. For example, in certain embodiments, the asset descriptor includes a SCADA system asset name, a SCADA system identifier, a SCADA system level and/or other information associated with a SCADA system. Additionally or alternatively, in one or more embodiments, the request 320 includes one or more user identifiers describing a user role for a user associated with access of a dashboard visualization. A user identifier includes, for example, an identifier for a user role name (e.g., a manager, an executive, a maintenance engineer, a process engineer, etc.). Additionally or alternatively, in one or more embodiments, the request 320 includes one or more metrics context identifiers describing context for the metrics. A metrics context identifier includes, for example, an identifier for a plant performance metric, an asset performance metric, a goal (e.g., review production related to one or more assets, etc.). Additionally or alternatively, in one or more embodiments, the request 320 includes a time interval identifier describing an interval of time for the metrics. A time interval identifier describes, for example, an interval of time for aggregated data such as hourly, daily, monthly, yearly etc. In one or more embodiments, a time interval identifier is a reporting time identifier describing an interval of time for the metrics.

In one or more embodiments, in response to the request 320, the contextual data component 306 obtains aggregated data associated with the portfolio of assets. In one or more embodiments, in response to the request 320, the contextual data component 306 obtains the aggregated data based on the asset descriptor, the user identifier, the one or more metrics context identifiers, and/or the time interval identifier. The aggregated data is, for example, an aggregation of the asset data 314 that is stored in the asset database 318. For example, in one or more embodiments, the aggregated data includes connected building data, sensor data, event data, process data, operational data, fault data, asset data, location data, and/or other data associated with the edge devices 161a-161n. Additionally or alternatively, the aggregated data is an aggregation of real-time values of the asset data 314 such as real-time data, live property value data, real-time sensor data, real-time event data, real-time process data, real-time operational data, real-time fault data, real-time asset data, real-time location data, and/or other real-time data associated with the edge devices 161a-161n. Additionally or alternatively, the aggregated data is an aggregation of metrics and/or statistics associated with the aggregation of the asset data 314. For example, in certain embodiments, the aggregated data includes KPI data and/or dashboard report data associated with the aggregation of the asset data 314. In one or more embodiments, the contextual data component 306 obtains the aggregated data from the asset database 318. Additionally or alternatively, in certain embodiments, the contextual data component 306 obtains at least a portion of the aggregated data directly from the edge devices 161a-161n.

In one or more embodiments, the contextual data component 306 determines contextual data for the portfolio of assets based on the aggregated data. For example, in one or more embodiments, the contextual data component 306 determines contextual data for the portfolio of assets based on asset relationship data for the aggregated data. The contextual data is, for example, data that provides context (e.g., contextual awareness) associated with the aggregation data. The asset relationship data includes information related to relationships, links, patterns and/or trends between one or more assets from the portfolio of assets. For example, in one or more embodiments, the asset relationship data includes labels, classifications, insights, inferences, machine learning data, attributes and/or other data for the aggregated data. In one or more embodiments, the asset relationship data provides one or more relationship insights with respect to the aggregated data and/or real-time data associated with the edge devices 161a-161n. In one or more embodiments, the asset relationship data includes respective probabilities for the respective relationships that define a probability (e.g., likelihood) that the relationship is true. In certain embodiments, the asset relationship data includes one or more predicted source assets and/or one or more predicted target assets for an event, alarm, and/or fault associated with one or more assets from the portfolio of assets. A predicted source asset is an asset predicted to be a source of an event, alarm and/or fault. A predicted target asset is an asset predicted to be affected by an event, alarm and/or fault associated with one or more source assets. Furthermore, in certain embodiments, the asset relationship data includes relationships, links, patterns and/or trends between the one or more predicted source assets and/or the one or more predicted target assets.

In one or more embodiments, the asset relationship data includes one or more relationship identifiers (e.g., one or more relationship labels) for one or more assets from the portfolio of assets. In one or more embodiments, the includes one or more relationship identifiers (e.g., one or more relationship labels) provide information related to one or more dependencies between respective assets from the portfolio of assets. For example, in certain embodiments, a portion of the asset relationship data for an asset includes a relationship identifier that indicates one or more related assets for the asset. Additionally or alternatively, in certain embodiments, a portion of the asset relationship data for an asset includes a relationship identifier that indicates one or more other assets in which the asset supplies data, control signals, physical elements, material, substances and/or physical products to the one or more other asset. For example, in an HVAC system, a relationship identifier between a first asset (e.g., an air handling unit) and a second asset (e.g., zones of a building) indicates that the first asset supplies the second asset with an entity, a material, and/or a substance, etc. (e.g., air). In another example, a relationship identifier between a first asset (e.g., an air handling unit) and a second asset (e.g., a chiller) indicates that the second asset supplies the first asset with chilled water. The chilled water may be chilled to several degrees below a desired temperature of occupants in a building. Additionally or alternatively, in certain embodiments, a portion of the asset relationship data for an asset includes a relationship identifier that indicates one or more other assets contained by the asset. Additionally or alternatively, in certain embodiments, a portion of the asset relationship data for an asset includes a relationship identifier that indicates one or more other assets that supplies data, control signals, physical elements, material, substances and/or physical products to the asset.

In one or more embodiments, the asset relationship data is generated based on an asset model. In one or more embodiments, the asset model is an asset relationship model that provides and/or predicts one or more relationships between assets in the portfolio of assets. The asset model comprises a set of nodes connected by links. Respective nodes of the asset model correspond to respective assets from the portfolio of assets. Respective links between the respective nodes correspond to and/or describe respective relationships between respective assets. In one or more embodiments, the asset model employs asset semantics to derive relationships among assets from the portfolio of assets. For example, in certain embodiments, asset model employs asset semantics related to connected building data, sensor data, real-time data, live property value data, event data, process data, operational data, fault data, asset data, location data, and/or other data for assets from the portfolio of assets. In certain embodiments, the asset model determines relationships, links, patterns and/or trends between connected building data, sensor data, real-time data, live property value data, event data, process data, operational data, fault data, asset data, location data, and/or other data for assets from the portfolio of assets. In certain embodiments, the asset model is an extensible object model associated with one or more knowledge graphs for one or more assets from the portfolio of assets.

In certain embodiments, the asset model determines one or more insights with respect to the aggregated data and/or real-time data associated with the edge devices 161a-161n. For example, in certain embodiments, the asset model identifies, classifies and/or predicts one or more context features associated with the aggregated data and/or real-time data associated with the edge devices 161a-161n. In certain embodiments, the asset model is a deep neural network trained for context awareness. In certain embodiments, the asset model employs fuzzy logic, a Bayesian network, a Markov logic network and/or another type of machine learning technique to determine the asset relationship data. In certain embodiments, the contextual data component 306 determines the asset relationship data based on respective annotations and/or labels associated with respective assets in the portfolio of assets. For example, in certain embodiments, the contextual data component 306 determines the relationship based on respective annotations and/or labels for asset properties, asset locations, asset sites, asset details, asset activities, asset functionalities, asset configurations, asset components, asset services, asset priorities and/or other asset information for respective assets in the portfolio of assets.

In certain embodiments, the contextual data component 306 determines the asset relationship data for an asset hierarchy associated with the portfolio of assets. For instance, in one or more embodiments, the contextual data component 306 determines the asset relationship data for an asset hierarchy associated with the edge devices 161a-161n in response to the request 320. In certain embodiments, the contextual data component 306 determines the asset relationship data for a portfolio of SCADA systems that includes one or more SCADA systems.

In one or more embodiments, the contextual data component 306 determines prioritized actions for the portfolio of assets based on the contextual data (e.g., the contextual data determined based on the asset relationship data). In an embodiment, the prioritized actions indicate which assets from the portfolio of assets should be serviced first. For example, in an embodiment, the prioritized actions indicate a first asset from the portfolio of assets that should be serviced first, a second asset from the portfolio of assets that should be serviced second, a third asset from the portfolio of assets that should be serviced third, etc. In one or more embodiments, the prioritized actions are configured as a list of prioritized actions for the portfolio of assets based on the contextual data and/or impact to the portfolio. For instance, in one or more embodiments, the contextual data component 306 ranks, based on impact of respective prioritized actions with respect to the portfolio of assets, the prioritized actions to generate the list of the prioritized actions. In one or more embodiments, the contextual data component 306 groups the prioritized actions for the portfolio of assets based on the contextual data. For instance, in one or more embodiments, the contextual data component 306 groups the prioritized actions for the portfolio of assets based on relationships, features, and/or attributes between the aggregated data.

In one or more embodiments, the contextual data component 306 determines the list of the prioritized actions for the portfolio of assets based on metrics associated with the aggregated data. In certain embodiments, in response to the request 320, the contextual data component 306 determines one or more metrics for an asset hierarchy associated with the portfolio of assets. For instance, in one or more embodiments, the contextual data component 306 determines one or more metrics for an asset hierarchy associated with the edge devices 161a-161n in response to the request 320. In one or more embodiments, the contextual data component 306 converts a portion of the asset data 314 into a metric for the portion of the asset data 314 and stores the metric for the portion of the asset data 314 into the asset database 318. In one or more embodiments, the contextual data component 306 determines the one or more metrics for the asset hierarchy based on a contextual model related to a time series mapping of attributes, features, and/or relationships for the asset data 314. For example, in one or more embodiments, the contextual data component 306 determines the contextual data for the asset hierarchy based on time series mapping of attributes, features, and/or relationships for the aggregated data.

In one example, the contextual data component 306 determines real-time sensor data included in the aggregated data. Furthermore, the contextual data component 306 determines the prioritized actions for the portfolio of assets based on the real-time sensor data. In another example, the contextual data component 306 determines historical trend data included in the aggregated data. Furthermore, the contextual data component 306 determines the prioritized actions for the portfolio of assets based on the historical trend data. In another example, the contextual data component 306 determines one or more relationships between the aggregated data. In one or more embodiments, the contextual data component 306 determines one or more relationships between a first portion of the aggregated data associated with an asset from the portfolio of assets and a second portion of the aggregated data associated with the asset. In one or more embodiments, the contextual data component 306 determines one or more relationships between a first portion of the aggregated data associated with a first asset from the portfolio of assets and a second portion of the aggregated data associated with a second asset from the portfolio of assets. Furthermore, the contextual data component 306 determines the prioritized actions for the portfolio of assets based on the one or more relationships between the aggregated data. In certain embodiments, the contextual data component 306 determines the prioritized actions for the portfolio of SCADA systems based on the contextual data.

In one or more embodiments, the contextual data component 306 determines the prioritized actions for the portfolio of assets based on a digital twin model associated with one or more assets from the portfolio of assets. Additionally or alternatively, in one or more embodiments, the contextual data component 306 determines the prioritized actions for the portfolio of assets based on a digital twin model associated with an operator identity associated with one or more assets from the portfolio of assets.

In one or more embodiment, in response to the request 320, the dashboard visualization component 308 generates dashboard visualization data 322 associated with the contextual data and/or the prioritized actions. For instance, in one or more embodiments, the dashboard visualization component 308 provides the dashboard visualization to an electronic interface of a computing device based on the dashboard visualization data 322. In one or more embodiments, the dashboard visualization data 322 and/or the dashboard visualization associated with the dashboard visualization data 322 includes the prioritized actions for the portfolio of assets. In one or more embodiments, the dashboard visualization data 322 and/or the dashboard visualization associated with the dashboard visualization data 322 includes the list of the prioritized actions. In one or more embodiments, the dashboard visualization data 322 and/or the dashboard visualization associated with the dashboard visualization data 322 includes the grouping of the prioritized actions for the portfolio of assets. In one or more embodiments, the dashboard visualization data 322 and/or the dashboard visualization associated with the dashboard visualization data 322 includes at least a portion of the contextual data associated with the portfolio of assets. In one or more embodiments, the dashboard visualization data 322 and/or the dashboard visualization associated with the dashboard visualization data 322 includes the metrics associated with the portfolio of assets. In one or more embodiment, in response to the request 320, the dashboard visualization component 308 associates aspects of the asset data 314 and/or metrics associated with the asset data 314 stored in the asset database 318 to provide the one or more metrics. In an aspect, the dashboard visualization component 308 determines the aspects of the asset data 314 and/or metrics associated with the asset data 314 stored in the asset database 318 based on the time series structure and/or the hierarchy structure of asset level of the asset database 318.

Additionally, in one or more embodiments, the dashboard visualization component 308 performs one or more actions based on the prioritized actions for the portfolio of assets. For instance, in one or more embodiments, the dashboard visualization component 308 generates dashboard visualization data 322 associated with the one or more actions. In an embodiment, an action includes generating a user-interactive electronic interface that renders a visual representation of the prioritized actions for the portfolio of assets and/or the one or more metrics. In another embodiment, an action from the one or more actions includes transmitting, to a computing device, one or more notifications associated with the prioritized actions for the portfolio of assets and/or the one or more metrics. In another embodiment, an action from the one or more actions includes providing an optimal process condition for an asset associated with the asset data 314. For example, in another embodiment, an action from the one or more actions includes adjusting a set-point and/or a schedule for an asset associated with the asset data 314. In another embodiment, an action from the one or more actions includes one or more corrective action to take for an asset associated with the asset data 314. In another embodiment, an action from the one or more actions includes providing an optimal maintenance option for an asset associated with the asset data 314. In another embodiment, an action from the one or more actions includes an action associated with the application services layer 225, the applications layer 230, and/or the core services layer 235.

Figure 4:
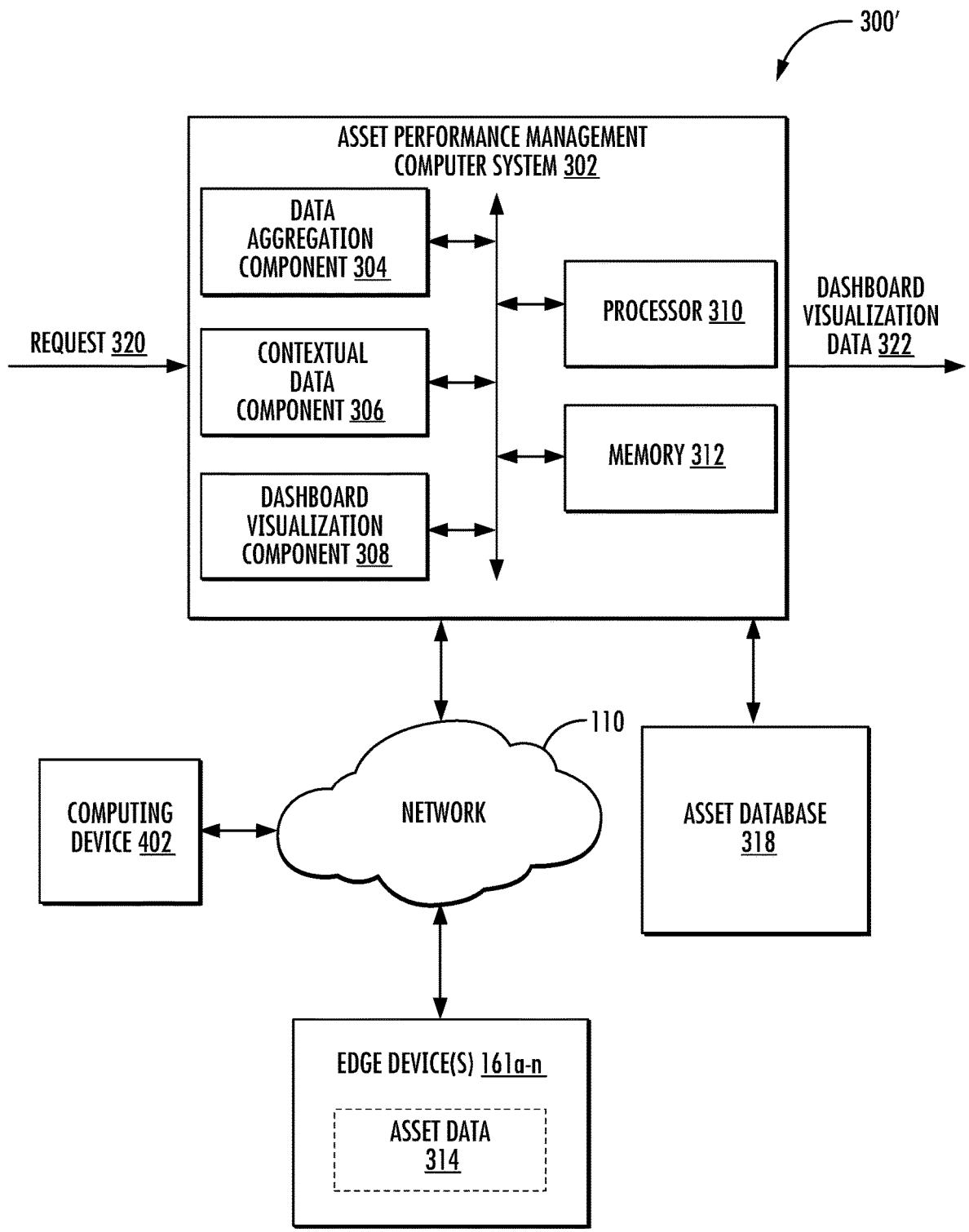
FIG. 4 illustrates another system that provides an exemplary environment, in accordance with one or more embodiments described herein.

FIG. 4 illustrates a system 300' that provides an exemplary environment according to one or more described features of one or more embodiments of the disclosure. In an embodiment, the system 300' corresponds to an alternate embodiment of the system 300 shown in FIG. 3. According to an embodiment, the system 300' includes the asset performance management computer system 302, the edge devices 161a-161n, the asset database 318 and/or a computing device 402. In one or more embodiments, the asset performance management computer system 302 is in communication with the edge devices 161a-161n and/or the computing device 402 via the network 110. The computing device 402 is a mobile computing device, a smartphone, a tablet computer, a mobile computer, a desktop computer, a laptop computer, a workstation computer, a wearable device, a virtual reality device, an augmented reality device, or another type of computing device located remote from the asset performance management computer system 302.

In one or more embodiments, the dashboard visualization component 308 communicates the dashboard visualization data 322 to the computing device 402. For example, in one or more embodiments, the dashboard visualization data 322 includes one or more visual elements for a visual display (e.g., a user-interactive electronic interface) of the computing device 402 that renders a visual representation of the prioritized actions for the portfolio of assets and/or the one or more metrics associated with the portfolio of assets. In certain embodiments, the visual display of the computing device 402 displays one or more graphical elements associated with the dashboard visualization data 322 (e.g., the one or more metrics). In another example, in one or more embodiments, the dashboard visualization data 322 includes one or notifications associated with the prioritized actions for the portfolio of assets and/or the one or more metrics associated with the portfolio of assets. In one or more embodiments, the dashboard visualization data 322 allows a user associated with the computing device 402 to make decisions and/or perform one or more actions with respect to the portfolio of assets. In one or more embodiments, the dashboard visualization data 322 allows a user associated with the computing device 402 to generate one or more work orders for the one or more assets of the portfolio of assets.

In one or more embodiments, the dashboard visualization data 322 allows a user associated with the computing device 402 to control the one or more portions of the assets of the portfolio of assets (e.g., one or more portions of the edge devices 161a-161n). For example, in one or more embodiments, the dashboard visualization is configured to provide remote control of at least one asset from the portfolio of assets. In certain embodiments, the dashboard visualization is configured to provide remote control of at least one edge device from the edge devices 161a-161n. In one or more embodiments, the dashboard visualization is configured to provide remote control of at least one asset from the portfolio of assets based on the contextual data and/or the prioritized actions for the portfolio of assets. The remote control of the at least one asset from the portfolio of assets includes modifying one or more settings of the at least one asset, modifying one or more parameters of the at least one asset, modifying one or more thresholds for the at least one asset, modifying one or more faults of the at least one asset (e.g., close one or more faults of the at least one asset), transmitting one or more command signals to the at least one asset, transmitting one or more control signals to the at least one asset, transmitting one or more protocol commands to the at least one asset, transmitting one or more firmware updates to the at least one asset, transmitting one or more logic commands to the at least one asset, transmitting one or more firmware updates to the at least one asset, and/or one or more other types of remote control of the at least one asset.

In one or more embodiments, the dashboard visualization data 322 provides one or more analytics alerts and/or one or more alarms (e.g., one or more BMS alarms) for the dashboard visualization and/or a display of the computing device 402. In one or more embodiments, alerts are grouped into common issues associated with assets via the dashboard visualization. In one or more embodiments, priorities associated with the portfolio of assets are presented via the dashboard visualization based on factors associated with the assets to facilitate generation of one or more actions for the portfolio of assets. In one or more embodiments, one or more notifications (e.g., one or more web-app notifications, one or more mobile notifications, etc.) are provided via the dashboard visualization and/or a display of the computing device 402. In one or more embodiments, one or more alerts across several assets is provided via the dashboard visualization and/or a display of the computing device 402. In one or more embodiments, live asset properties (e.g., value, status, trends, service cases, etc.) are displayed via the dashboard visualization. In one or more embodiments, a predicted root cause of an issue associated with the portfolio of assets is provided via the dashboard visualization. In one or more embodiments, insights and/or logs are recorded for one or more previously generated services cases and/or one or more new service cases. In another embodiment, the dashboard visualization associated with the dashboard visualization data 322 is configured to allow a user to provide a response to an issue related to the portfolio of assets. In one or more embodiments, one or more control changes (e.g., set-points, status, automatic control changes, manual control changes, etc.) can be made via the dashboard visualization. In one or more embodiments, a service case can be assigned to an operator (e.g., a service technician) via the dashboard visualization. In another embodiment, the dashboard visualization associated with the dashboard visualization data 322 provides for viewing services cases, updating service cases, performing actions with respect to service cases, and/or closing services cases. In one or more embodiments, the dashboard visualization provides for reports on service case trends for on-going improvements with respect to the portfolio of assets.

Figure 5:
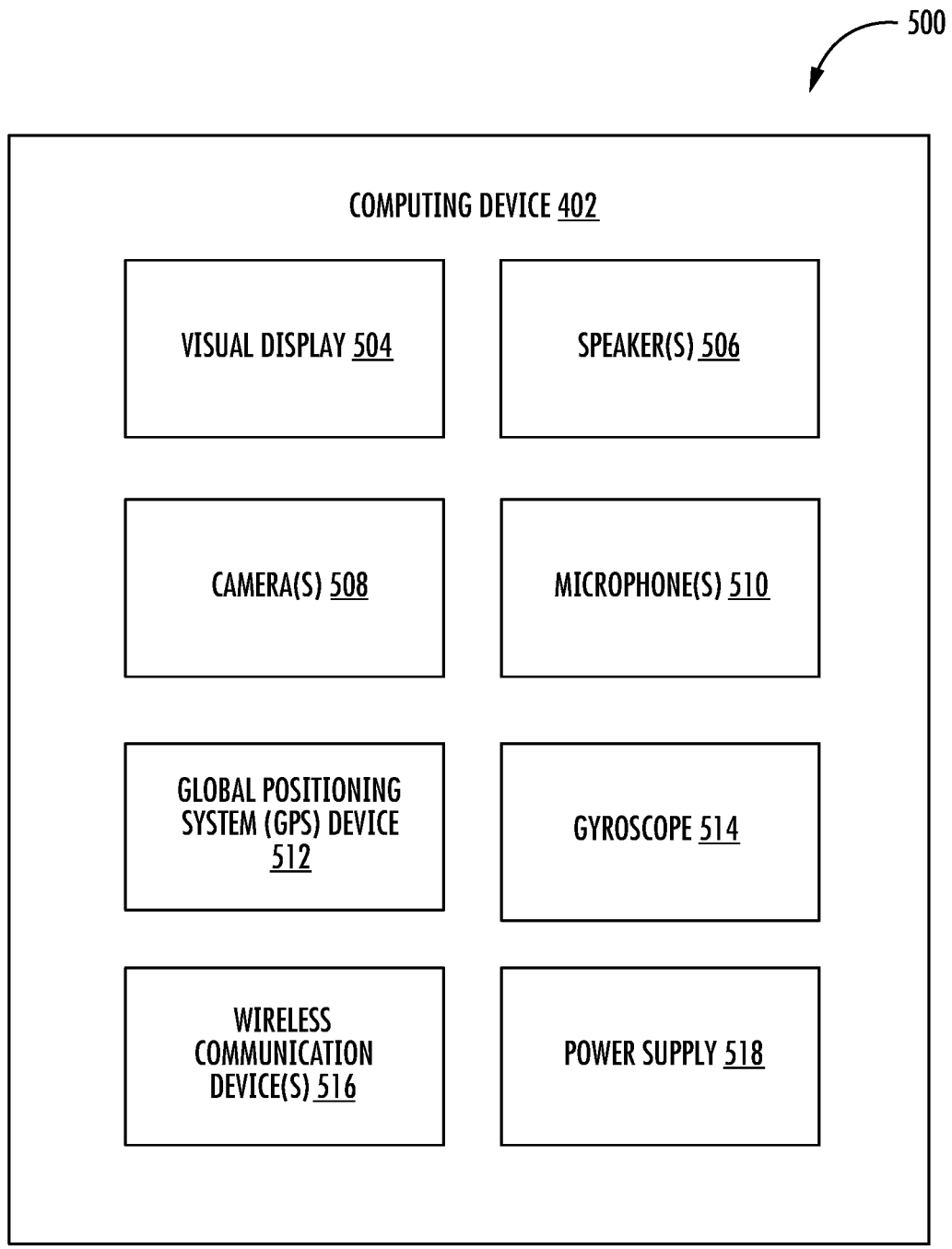
FIG. 5 illustrates an exemplary computing device, in accordance with one or more embodiments described herein.

FIG. 5 illustrates a system 500 according to one or more embodiments of the disclosure. The system 500 includes the computing device 402. In one or more embodiments, the computing device 402 employs mobile computing, augmented reality, cloud-based computing, IoT technology and/or one or more other technologies to provide performance data, video, audio, text, graphs, charts, real-time data, graphical data, one or more communications, one or more messages, one or more notifications, and/or other media data associated with the one or more metrics. The computing device 402 includes mechanical components, electrical components, hardware components and/or software components to facilitate determining prioritized actions and/or one or more metrics associated with the asset data 314. In the embodiment shown in FIG. 5, the computing device 402 includes a visual display 504, one or more speakers 506, one or more cameras 508, one or more microphones 510, a global positioning system (GPS) device 512, a gyroscope 514, one or more wireless communication devices 516, and/or a power supply 518.

In an embodiment, the visual display 504 is a display that facilitates presentation and/or interaction with one or more portions of the dashboard visualization data 322. In one or more embodiments, the computing device 402 displays an electronic interface (e.g., a graphical user interface) associated with an asset performance management platform. In one or more embodiments, the visual display 504 is a visual display that renders one or more interactive media elements via a set of pixels. The one or more speakers 506 include one or more integrated speakers that project audio. The one or more cameras 508 include one or more cameras that employ autofocus and/or image stabilization for photo capture and/or real-time video. The one or more microphones 510 include one or more digital microphones that employ active noise cancellation to capture audio data. The GPS device 512 provides a geographic location for the computing device 402. The gyroscope 514 provides an orientation for the computing device 402. The one or more wireless communication devices 516 includes one or more hardware components to provide wireless communication via one or more wireless networking technologies and/or one or more short-wavelength wireless technologies. The power supply 518 is, for example, a power supply and/or a rechargeable battery that provides power to the visual display 504, the one or more speakers 506, the one or more cameras 508, the one or more microphones 510, the GPS device 512, the gyroscope 514, and/or the one or more wireless communication devices 516. In certain embodiments, the dashboard visualization data 322 associated with the prioritized actions and/or the one or more metrics is presented via the visual display 504 and/or the one or more speakers 506. In one or more embodiments, the visual display 504 provides a dashboard visualization that is configured to allow a user associated with the computing device 402 to control the one or more portions of the assets of the portfolio of assets (e.g., one or more portions of the edge devices 161a-161n).

Figure 6:
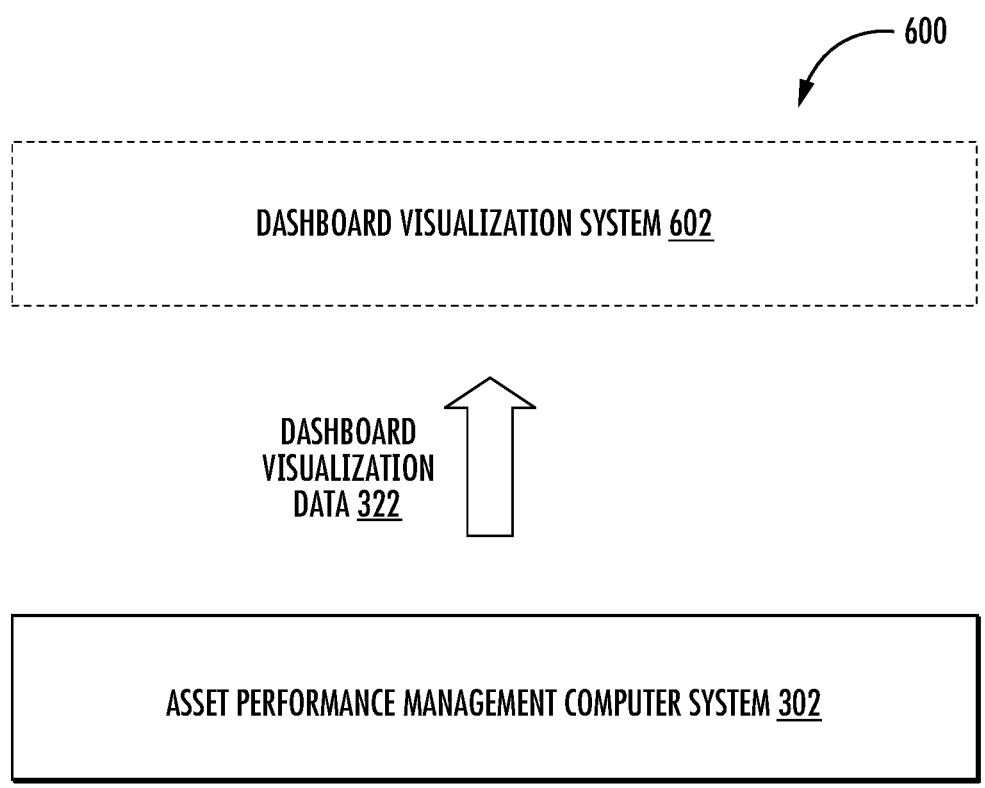
FIG. 6 illustrates an exemplary system associated a dashboard visualization system, in accordance with one or more embodiments described herein.

FIG. 6 illustrates a system 600 according to one or more described features of one or more embodiments of the disclosure. In an embodiment, the system 600 includes the asset performance management computer system 302 and a dashboard visualization system 602. The asset performance management computer system 302 includes the data aggregation component 304, the contextual data component 306, the dashboard visualization component 308, the processor 310 and/or the memory 312. Furthermore, in certain embodiments, the asset performance management computer system 302 is communicatively coupled to the edge devices 161a-161n and/or the asset database 318. The dashboard visualization system 602 is associated with a dashboard visualization service (e.g., an asset detail panel service). In one or more embodiments, the dashboard visualization system 602 is associated with the application services layer 225. In one or more embodiments, the dashboard visualization system 602 is accessible and/or implemented via the computing device 402. In one or more embodiments, the dashboard visualization system 602 is configured to provide the dashboard visualization related to the portfolio of assets. In one or more embodiments, the asset performance management computer system 302 is configured to provide the dashboard visualization data 322 to the dashboard visualization system 602 to facilitate rendering of the dashboard visualization related to the portfolio of assets.

Figure 7:
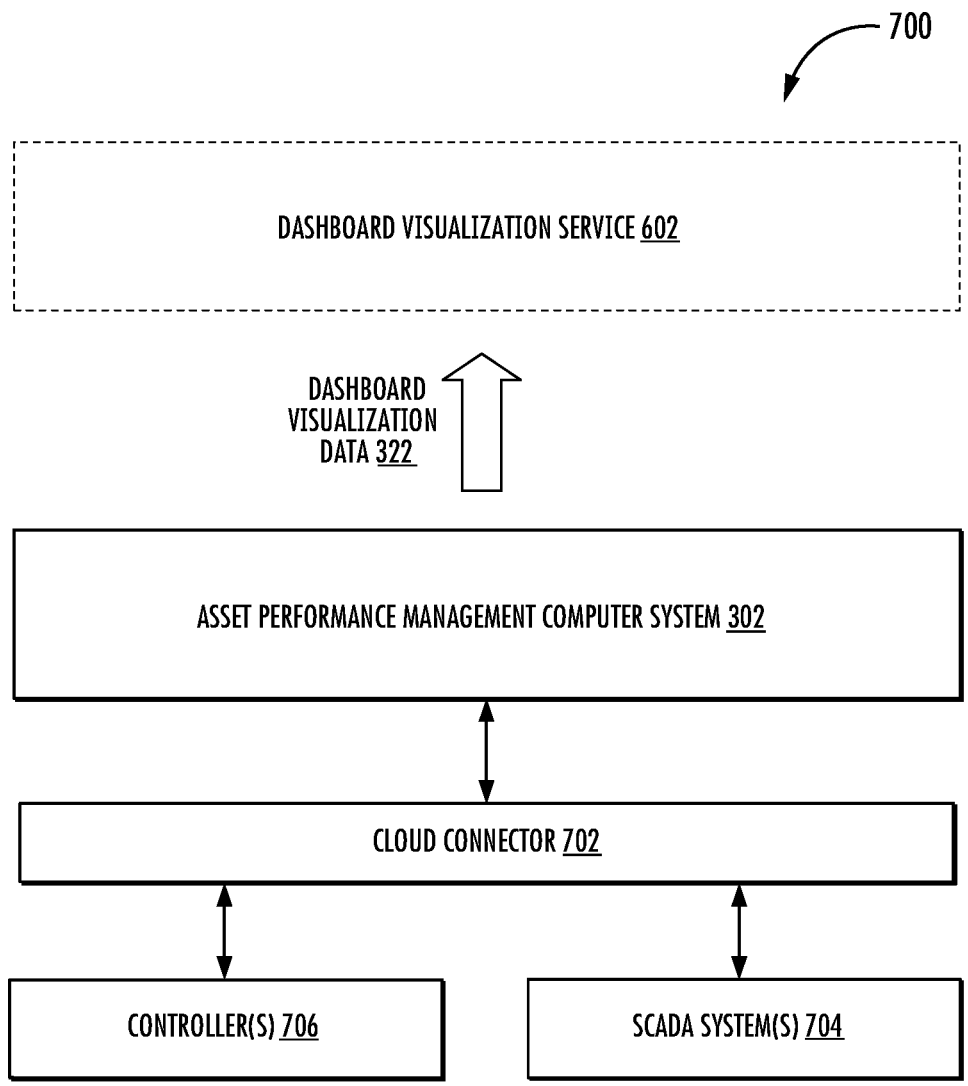
FIG. 7 illustrates another exemplary system associated a dashboard visualization system, in accordance with one or more embodiments described herein.

FIG. 7 illustrates a system 700 according to one or more described features of one or more embodiments of the disclosure. In an embodiment, the system 700 includes the asset performance management computer system 302, the dashboard visualization system 602, a cloud connector 702, one or more SCADA systems 704 and/or one or more controllers 706. In certain embodiments, the one or more SCADA systems 704 include the one or more controllers 706. The asset performance management computer system 302 includes the data aggregation component 304, the contextual data component 306, the dashboard visualization component 308, the processor 310 and/or the memory 312. Furthermore, in certain embodiments, the asset performance management computer system 302 is communicatively coupled to the edge devices 161a-161n and/or the asset database 318. The cloud connector 702 is configured to provide an interface between the asset performance management computer system 302, the cloud connector 702, the one or more SCADA systems 704 and/or the one or more controllers 706. In certain embodiments, the cloud connector 702 is configured to obtain at least a portion of the asset data 314 from the one or more SCADA systems 704 and/or the one or more controllers 706. In certain embodiments, the cloud connector 702 is configured to provide and/or manage encryption, policies, and/or security keys related to obtaining at least a portion of the asset data 314 from the one or more SCADA systems 704 and/or the one or more controllers 706.

Figure 8:
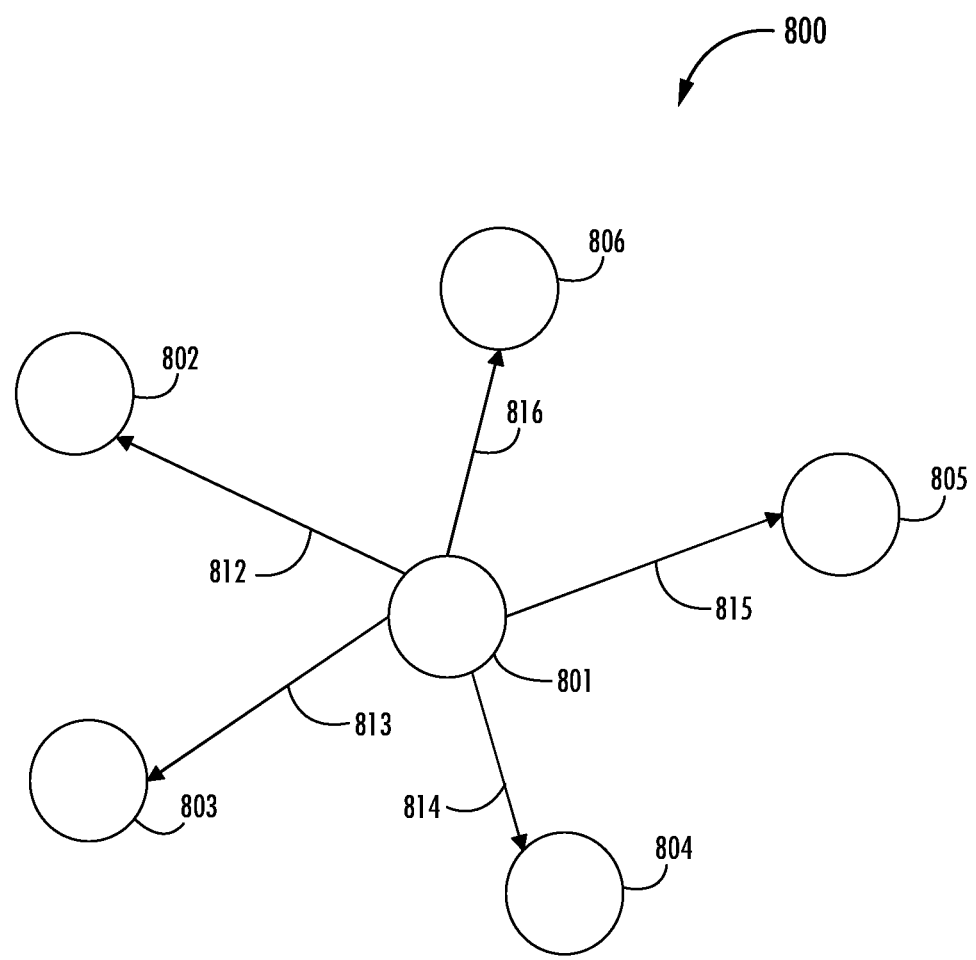
FIG. 8 illustrates an exemplary asset model, in accordance with one or more embodiments described herein.

FIG. 8 illustrates an exemplary asset model 800 according to one or more described features of one or more embodiments of the disclosure. In one or more embodiments, the asset model 800 is an extensible object model that includes a knowledge graph for one or more assets from the portfolio of assets. Furthermore, in one or more embodiments, the asset model 800 includes a set of nodes and/or a set of connectors that graphically represents assets and corresponding relationships between the assets. For example, in an embodiment, nodes 801-806 are connected together by links 812-816 (e.g., connectors). Each of the nodes 801-806 correspond to an asset of a portfolio of assets. For example, in an embodiment, each of the nodes 801-806 correspond to an edge device from the edge devices 161a-161n. Additionally, each of the links 812-816 describe a relationship between two or more of the assets. For example, in an embodiment, node 801 corresponds to a first asset that is connected to one or more second assets that correspond to nodes 802-806. In an embodiment, the asset relationship data indicates that the first asset that corresponds to the node 801 is linked to and/or dependent on the one or more second assets that correspond to the nodes 802-806. The relationship between the first asset and each second asset is defined using connectors (e.g., links) 812-816. Additionally, when a relationship is defined for one or more assets, in certain embodiments, a probability for each relationship is also defined (e.g., such that the relationship is a "probabilistic relationship" as opposed to a "deterministic relationship"). Thus, in certain embodiments, each relationship comprises a respective probability, where a nature, strength, etc. of the relationship is uncertain and is defined by a probability (e.g., a likelihood) that the defined relationship is true.

In certain embodiments, based on the link between the first asset that corresponds to the node 801 and the one or more second assets that correspond to the nodes 802-806, the contextual data component 306 determines contextual data related to patterns and/or trends between data for the first asset that corresponds to the node 801 and the one or more second assets that correspond to the nodes 802-806. For example, in certain embodiments, based on the link between the first asset that corresponds to the node 801 and the one or more second assets that correspond to the nodes 802-806, the contextual data component 306 determines contextual data related to patterns and/or trends between connected building data, sensor data, real-time data, live property value data, event data, process data, operational data, fault data, asset data, location data, and/or other data for the first asset that corresponds to the node 801 and the one or more second assets that correspond to the nodes 802-806. In certain embodiments, in response to an event, alarm and/or fault associated with the first asset that corresponds to the node 801, the asset relationship data can indicate that the first asset that corresponds to the node 801 is a source asset for the event, alarm and/or fault and the one or more second assets that correspond to the nodes 802-806 are target assets for the event, alarm and/or fault. For example, in an embodiment, the connectors (e.g., links) 812-816 indicate that the first asset that corresponds to the node 801 supplies data, control signals, physical elements, material, substances and/or physical products to the one or more second assets that correspond to the nodes 802-806. In another example, the connectors (e.g., links) 812-816 indicate that the first asset that corresponds to the node 801 contains the one or more second assets that correspond to the nodes 802-806. In another example, the connectors (e.g., links) 812-816 indicate that the one or more second assets that correspond to the nodes 802-806 supply data, control signals, physical elements, material, substances and/or physical products to the first asset that corresponds to the node 801.

Figure 9:
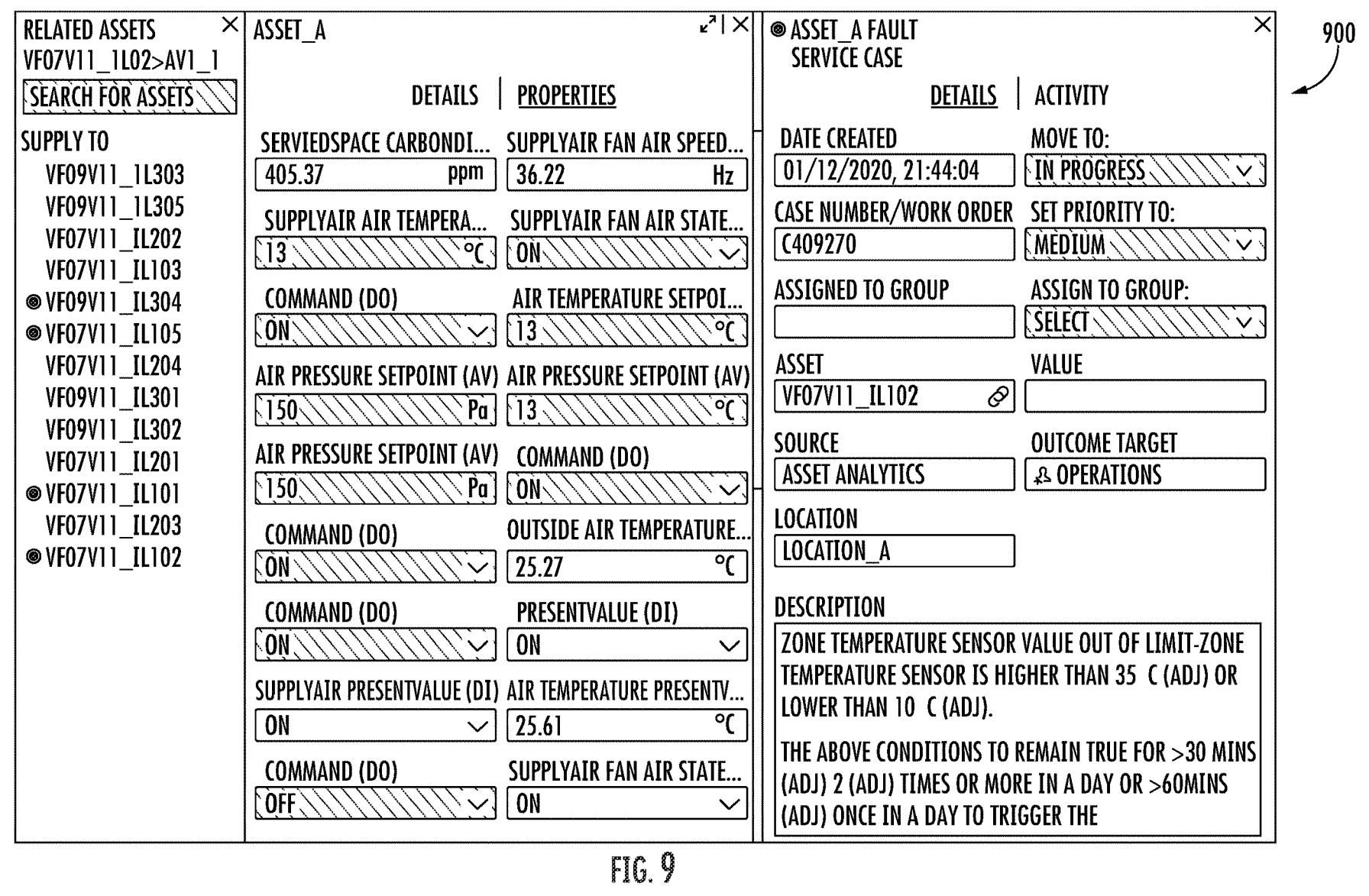

FIG. 9 illustrates an exemplary electronic interface 900 according to one or more embodiments of the disclosure. In an embodiment, the electronic interface 900 is an electronic interface of the computing device 402 that is presented via the visual display 504. In one or more embodiments, a dashboard visualization is presented via the electronic interface 900. In certain embodiments, the data visualization presented via the electronic interface 900 presents a visualization of contextual data for a portfolio of assets to facilitate analysis of a portfolio of assets via the dashboard visualization associated with the electronic interface 900. In certain embodiments, the data visualization presented via the electronic interface 900 facilitates remote control of at least one asset from a portfolio of assets via the dashboard visualization associated with the electronic interface 900. For example, in certain embodiments, the data visualization presented via the electronic interface 900 facilitates modification of at least one setting for at least one asset from a portfolio of assets via the dashboard visualization associated with the electronic interface 900. In certain embodiments, the data visualization presented via the electronic interface 900 presents a visualization of alerts grouped based on contextual data for a portfolio of assets to facilitate analysis of the portfolio of assets via the dashboard visualization associated with the electronic interface 900. In certain embodiments, the data visualization presented via the electronic interface 900 is a dashboard visualization for a first asset (e.g., ASSET_A) that is presented in response to a user initiating the dashboard visualization via another dashboard visualization associated with prioritized actions for a portfolio of assets. For example, in certain embodiments, the visualization presented via the electronic interface 900 is a dashboard visualization associated with an alert (e.g., ASSET_A FAULT alert) and/or a prioritized action presented via another dashboard visualization associated with prioritized actions for a portfolio of assets. In an embodiment, the alert is associated with a zone temperature of the first asset being out of a limit (e.g., higher than 35° C. or lower than 10° C.).

FIG. 10 illustrates an exemplary electronic interface 1000 according to one or more embodiments of the disclosure. In an embodiment, the electronic interface 1000 is an electronic interface of the computing device 402 that is presented via the visual display 504. In one or more embodiments, a dashboard visualization is presented via the electronic interface 1000. In certain embodiments, the data visualization presented via the electronic interface 1000 presents a visualization of contextual data for a portfolio of assets to facilitate analysis of a portfolio of assets via the dashboard visualization associated with the electronic interface 1000. In certain embodiments, the data visualization presented via the electronic interface 1000 facilitates remote control of at least one asset from a portfolio of assets via the dashboard visualization associated with the electronic interface 1000. For example, in certain embodiments, the data visualization presented via the electronic interface 1000 facilitates modification of at least one setting for at least one asset from a portfolio of assets via the dashboard visualization associated with the electronic interface 1000. In certain embodiments, the data visualization presented via the electronic interface 1000 presents a visualization of alerts grouped based on contextual data for a portfolio of assets to facilitate analysis of the portfolio of assets via the dashboard visualization associated with the electronic interface 1000. In certain embodiments, the data visualization presented via the electronic interface 1000 is a dashboard visualization for a first asset (e.g., ASSET_B) that is presented in response to a user initiating the dashboard visualization via another dashboard visualization associated with prioritized actions for a portfolio of assets. For example, in certain embodiments, the visualization presented via the electronic interface 1000 is a dashboard visualization associated with an alert (e.g., ASSET_B FAULT alert) and/or a prioritized action presented via another dashboard visualization associated with prioritized actions for a portfolio of assets. In an embodiment, the alert is associated with a zone temperature of the first asset being out of a limit (e.g., higher than 35° C. or lower than 10° C.).

FIG. 11 illustrates an exemplary electronic interface 1100 according to one or more embodiments of the disclosure. In an embodiment, the electronic interface 1100 is an electronic interface of the computing device 402 that is presented via the visual display 504. In one or more embodiments, a dashboard visualization is presented via the electronic interface 1100. In certain embodiments, the data visualization presented via the electronic interface 1100 presents a visualization of prioritized actions for a portfolio of assets based on contextual data for the portfolio of assets to facilitate analysis of the portfolio of assets via the dashboard visualization associated with the electronic interface 1100. In certain embodiments, the data visualization presented via the electronic interface 1100 presents a visualization of alerts grouped based on contextual data for a portfolio of assets to facilitate analysis of the portfolio of assets via the dashboard visualization associated with the electronic interface 1100.

FIG. 12 illustrates an exemplary electronic interface 1200 according to one or more embodiments of the disclosure. In an embodiment, the electronic interface 1200 is an electronic interface of the computing device 402 that is presented via the visual display 504. In one or more embodiments, a dashboard visualization is presented via the electronic interface 1200. In certain embodiments, the data visualization presented via the electronic interface 1200 presents a visualization of prioritized actions for a portfolio of assets based on contextual data for the portfolio of assets to facilitate analysis of the portfolio of assets via the dashboard visualization associated with the electronic interface 1200. In certain embodiments, the data visualization presented via the electronic interface 1200 presents a visualization of alerts grouped based on contextual data for a portfolio of assets to facilitate analysis of the portfolio of assets via the dashboard visualization associated with the electronic interface 1200.

Figure 13:
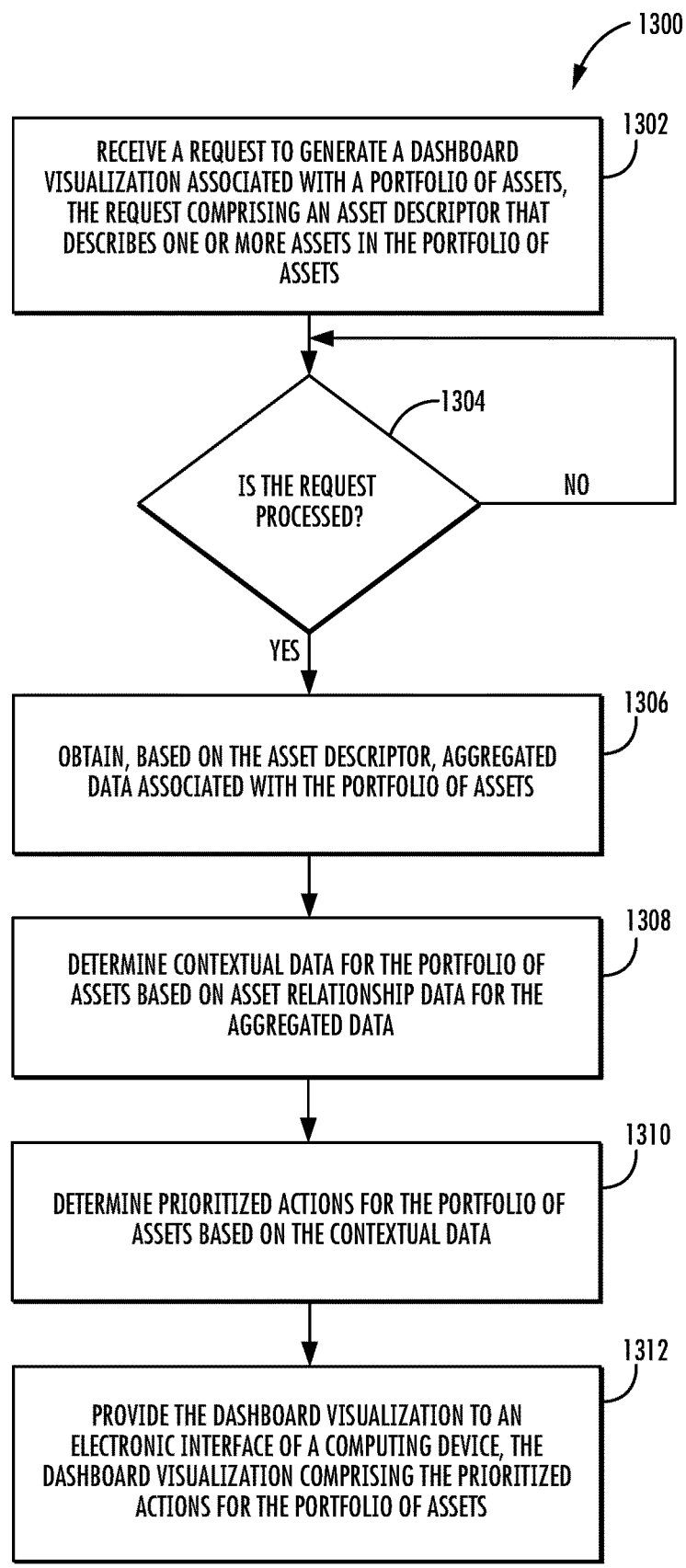
FIG. 13 illustrates a flow diagram for remote monitoring and management of assets from a portfolio of assets based on an asset model, in accordance with one or more embodiments described herein.

FIG. 13 illustrates a method 1300 for remote monitoring and management of assets from a portfolio of assets based on an asset model, in accordance with one or more embodiments described herein. The method 1300 is associated with the asset performance management computer system 302, for example. For instance, in one or more embodiments, the method 1300 is executed at a device (e.g. the asset performance management computer system 302) with one or more processors and a memory. In one or more embodiments, the method 1300 begins at block 1302 that receives (e.g., by the contextual data component 306 and/or the dashboard visualization component 308) a request to generate a dashboard visualization associated with a portfolio of assets, the request comprising an asset descriptor describing one or more assets in the portfolio of assets. The request to generate the dashboard visualization provides one or more technical improvements such as, but not limited to, facilitating interaction with a computing device and/or extended functionality for a computing device.

At block 1304, it is determined whether the request is processed. If no, block 1304 is repeated to determine whether the request is processed. If yes, the method 1300 proceeds to block 1306. In response to the request, block 1306 that obtains, based on the asset descriptor, aggregated data associated with the portfolio of assets. The obtaining the aggregated data based on the asset descriptor provides one or more technical improvements such as, but not limited to, extended functionality for a computing device.

In response to the request, the method 1300 also includes a block 1308 that determines (e.g., by the contextual data component 306) contextual data for the portfolio of assets based on asset relationship data for the aggregated data. The determining the context data provides one or more technical improvements such as, but not limited to, improving accuracy of the dashboard visualization.

In response to the request, the method 1300 also includes a block 1310 that determines (e.g., by the contextual data component 306) prioritized actions for the portfolio of assets based on the contextual data. The determining the prioritized actions for the portfolio of assets provides one or more technical improvements such as, but not limited to, improving accuracy of the dashboard visualization. In one or more embodiments, the determining the prioritized actions for the portfolio of assets includes determining the prioritized actions for the portfolio of assets based on a digital twin model associated with one or more assets from the portfolio of assets. Additionally or alternatively, in one or more embodiments, the determining the prioritized actions for the portfolio of assets includes determining the prioritized actions for the portfolio of assets based on a digital twin model associated with an operator identity associated with one or more assets from the portfolio of assets.

In one or more embodiments, the determining the contextual data comprises determining real-time sensor data included in the aggregated data. Furthermore, in one or more embodiments, the determining the prioritized actions comprises determining the prioritized actions for the portfolio of assets based on the real-time sensor data. In one or more embodiments, the determining the contextual data comprises determining historical trend data included in the aggregated data. Furthermore, in one or more embodiments, the determining the prioritized actions comprising determining the prioritized actions for the portfolio of assets based on the historical trend data. In one or more embodiments, the asset relationship data comprises a relationship between first fault data associated with a first asset from the portfolio of assets and second fault data associated with a second asset from the portfolio of assets. Furthermore, in one or more embodiments, the determining the contextual data comprising determining the contextual data based on the relationship between the first fault data and the second fault data. In one or more embodiments the asset relationship data comprises a relationship between first fault priority data associated with a first asset from the portfolio of assets and second fault priority data associated with a second asset from the portfolio of assets. Furthermore, in one or more embodiments, the determining the contextual data comprising determining the contextual data based on the relationship between the first fault priority data and the second fault priority data. In one or more embodiments, the asset relationship data comprises one or more relationships between the aggregated data. Furthermore, in one or more embodiments, the determining the prioritized actions comprising determining the prioritized actions for the portfolio of assets based on the one or more relationships between the aggregated data. In one or more embodiments, the asset relationship data comprises one or more relationships between a first portion of the aggregated data associated with an asset from the portfolio of assets and a second portion of the aggregated data associated with the asset. Furthermore, in one or more embodiments, the determining the prioritized actions comprising determining the prioritized actions for the portfolio of assets based on the one or more relationships between the first portion of the aggregated data and the second portion of the aggregated data. In one or more embodiments, the asset relationship data comprises one or more relationships between a first portion of the aggregated data associated with a first asset from the portfolio of assets and a second portion of the aggregated data associated with a second asset from the portfolio of assets. Furthermore, in one or more embodiments, the determining the prioritized actions comprising determining the prioritized actions for the portfolio of assets based on the one or more relationships between the first portion of the aggregated data and the second portion of the aggregated data.

In response to the request, the method 1300 also includes a block 1312 that provides (e.g., by the dashboard visualization component 308) the dashboard visualization to an electronic interface of a computing device, the dashboard visualization comprising the prioritized actions for the portfolio of assets. The providing the dashboard visualization with the prioritized actions for the portfolio of assets provides one or more technical improvements such as, but not limited to, what and/or how to present information via a computing device.

In one or more embodiments, the request additionally or alternatively includes a user identifier describing a user role for a user associated with access of the dashboard visualization via the electronic interface. Furthermore, in one or more embodiments, the obtaining the aggregated data additionally or alternatively includes obtaining the aggregated data based on the user identifier. The obtaining the aggregated data based on the user identifier provides one or more technical improvements such as, but not limited to, extended functionality for a computing device. In one or more embodiments, the method 1300 also includes configuring the dashboard visualization based on the user identifier. The configuring the dashboard visualization based on the user identifier provides one or more technical improvements such as, but not limited to, what and/or how to present information via a computing device.

In one or more embodiments, the request additionally or alternatively includes a metrics context identifier describing context for metrics. Furthermore, in one or more embodiments, the obtaining the aggregated data includes obtaining the aggregated data based on the metrics context identifier. The obtaining the aggregated data based on the metrics context identifier provides one or more technical improvements such as, but not limited to, extended functionality for a computing device. In one or more embodiments, different types of aggregates such as maximum, minimum, count, sum, and/or average are supported. Additionally, in one or more embodiments, a calculation is custom defined based on the metrics being aggregated at different levels to, for example, provide improved extensibility.

In one or more embodiments, the request additionally or alternatively includes a time interval identifier (e.g., a reporting time interval identifier) describing an interval of time for the metrics. Furthermore, in one or more embodiments, the obtaining the aggregated data includes obtaining the aggregated data based on the time interval identifier (e.g., the reporting time interval identifier). The obtaining the aggregated data based on the time interval identifier (e.g., the reporting time interval identifier) provides one or more technical improvements such as, but not limited to, extended functionality for a computing device.

In one or more embodiments, the method 1300 also includes grouping the prioritized actions for the portfolio of assets based on the contextual data, the dashboard visualization configuring the prioritized actions based on the grouping of the prioritized actions for the portfolio of assets. The grouping the prioritized actions provides one or more technical improvements such as, but not limited to, what and/or how to present information via a computing device.

In one or more embodiments, the method 1300 also includes ranking, based on impact of respective prioritized actions with respect to the portfolio of assets, the prioritized actions to generate a list of the prioritized actions. Additionally or alternatively, in one or more embodiments, the method 1300 also includes providing the list of the prioritized actions to the electronic interface via the dashboard visualization. The ranking provides one or more technical improvements such as, but not limited to, what and/or how to present information via a computing device.

In one or more embodiments, the method 1300 also includes determining a list of the prioritized actions for the portfolio of assets based on the contextual data. Additionally or alternatively, in one or more embodiments, the method 1300 also includes providing the list of the prioritized actions to the electronic interface via the dashboard visualization. The determining the list of the prioritized actions provides one or more technical improvements such as, but not limited to, what and/or how to present information via a computing device.

In one or more embodiments, the method 1300 also includes modeling of the aggregated data based on different hierarchy level of assets. The modeling provides one or more technical improvements such as, but not limited to, improving accuracy of the dashboard visualization.

In one or more embodiments, the method 1300 also includes aggregating multiple types of contextual data for the portfolio of assets based on the aggregated data. The aggregating the multiple types of contextual data provides one or more technical improvements such as, but not limited to, improving accuracy of the dashboard visualization.

In one or more embodiments, the method 1300 also includes determining an alerts list associated with one or more recommendations for the portfolio of assets based on the prioritized actions for the portfolio of assets. Additionally, in one or more embodiments, the method 1300 also includes providing the alerts list to the electronic interface via the dashboard visualization. The providing the alerts list to the electronic interface provides one or more technical improvements such as, but not limited to, what and/or how to present information via a computing device.

In one or more embodiments, the determining the contextual data comprises determining the contextual data for different hierarchy level of assets. In one or more embodiments, the method 1300 also includes configuring the dashboard visualization to facilitate providing the contextual data for with respect to different hierarchy level of assets. The providing the configuring the dashboard visualization provides one or more technical improvements such as, but not limited to, extending functionality of the dashboard visualization and providing what and/or how to present information via a computing device.

In one or more embodiments, the method 1300 also includes configuring the dashboard visualization to provide individual control of the one or more assets in the portfolio of assets via the dashboard visualization. The control of the one or more assets provides one or more technical improvements such as, but not limited to, necessary interaction with the dashboard visualization and/or improved performance of the one or more assets.

In one or more embodiments, the method 1300 also includes configuring the dashboard visualization to facilitate creation of one or more work orders for the one or more assets in the portfolio of assets. The creation of the one or more work orders provides one or more technical improvements such as, but not limited to, necessary interaction with the dashboard visualization and/or improved performance of the one or more assets.

Figure 14:
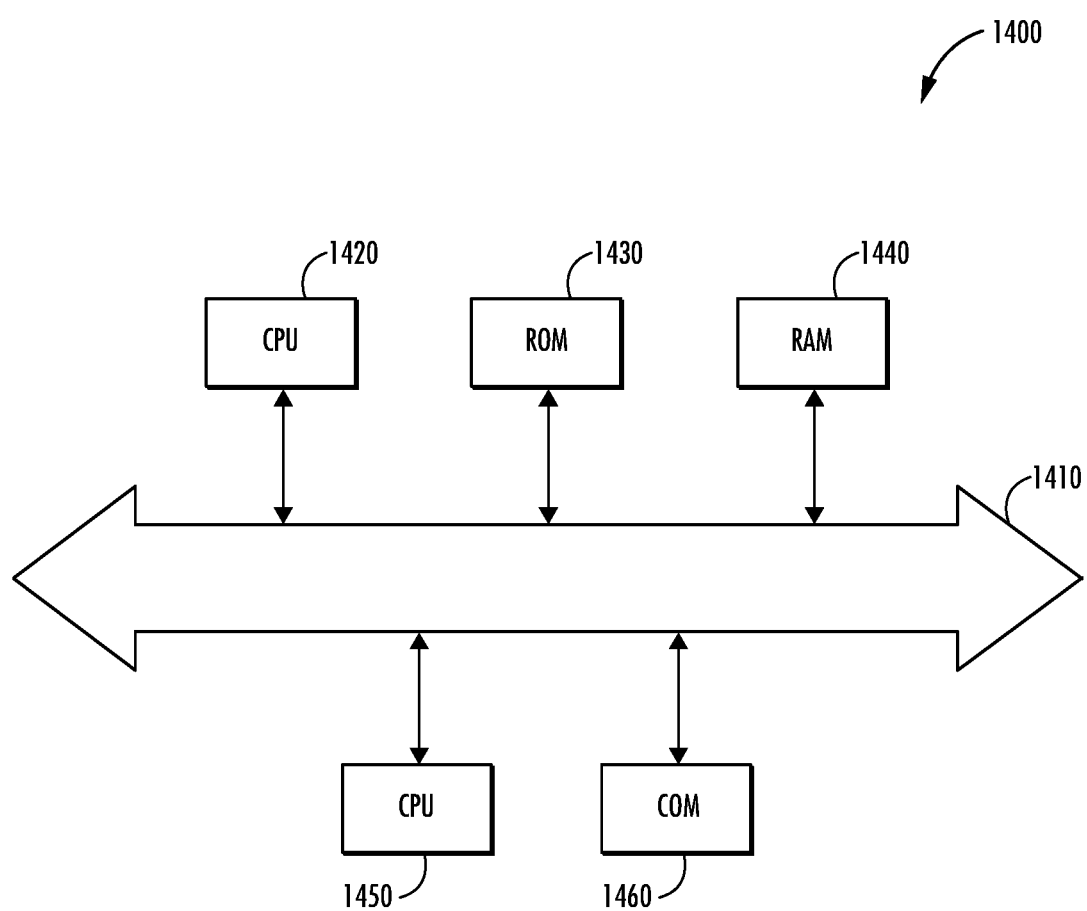
FIG. 14 illustrates a functional block diagram of a computer that may be configured to execute techniques described in accordance with one or more embodiments described herein.

FIG. 14 depicts an example system 1400 that may execute techniques presented herein. FIG. 14 is a simplified functional block diagram of a computer that may be configured to execute techniques described herein, according to exemplary embodiments of the present disclosure. Specifically, the computer (or "platform" as it may not be a single physical computer infrastructure) may include a data communication interface 1460 for packet data communication. The platform also may include a central processing unit ("CPU") 1420, in the form of one or more processors, for executing program instructions. The platform may include an internal communication bus 1410, and the platform also may include a program storage and/or a data storage for various data files to be processed and/or communicated by the platform such as ROM 1430 and RAM 1440, although the system 1400 may receive programming and data via network communications. The system 1400 also may include input and output ports 1450 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

In some example embodiments, certain ones of the operations herein can be modified or further amplified as described below. Moreover, in some embodiments additional optional operations can also be included. It should be appreciated that each of the modifications, optional additions or amplifications described herein can be included with the operations herein either alone or in combination with any others among the features described herein.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments can be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

It is to be appreciated that 'one or more' includes a function being performed by one element, a function being performed by more than one element, e.g., in a distributed fashion, several functions being performed by one element, several functions being performed by several elements, or any combination of the above.

Moreover, it will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

The hardware used to implement the various illustrative logics, logical blocks, modules, and circuits described in connection with the aspects disclosed herein can include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor can be a microprocessor, but, in the alternative, the processor can be any processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Alternatively, or in addition, some steps or methods can be performed by circuitry that is specific to a given function.

In one or more example embodiments, the functions described herein can be implemented by special-purpose hardware or a combination of hardware programmed by firmware or other software. In implementations relying on firmware or other software, the functions can be performed as a result of execution of one or more instructions stored on one or more non-transitory computer-readable media and/or one or more non-transitory processor-readable media. These instructions can be embodied by one or more processor-executable software modules that reside on the one or more non-transitory computer-readable or processor-readable storage media. Non-transitory computer-readable or processor-readable storage media can in this regard comprise any storage media that can be accessed by a computer or a processor. By way of example but not limitation, such non-transitory computer-readable or processor-readable media can include random access memory (RAM), read-only memory (ROM), electrically erasable programmable read-only memory (EEPROM), FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media can be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components can be used in conjunction with the supply management system. Therefore, it is to be understood that the inventions are not to be limited to the specific embodiments disclosed and that modifications and other embodiments are intended to be included within the scope of the appended claims. Moreover, the steps in the method described above can not necessarily occur in the order depicted in the accompanying diagrams, and in some cases one or more of the steps depicted can occur substantially simultaneously, or additional steps can be involved. Although specific terms are employed herein, they are used in a generic and descriptive sense only and not for purposes of limitation.

It is intended that the specification and examples be considered as exemplary only, with a true scope and spirit of the disclosure being indicated by the following claims.

What is claimed is:

1. A system, comprising:
one or more processors;
a memory; and
one or more programs stored in the memory, the one or more programs comprising instructions configured to:
    receive a request to generate a dashboard visualization associated with a portfolio of assets, the request comprising:
        an asset descriptor, the asset descriptor describing one or more assets in the portfolio of assets; and
    in response to the request:
        obtain, based on the asset descriptor, aggregated data associated with one or more related assets;
        traverse the aggregated data associated with the one or more related assets;
        determine asset relationship data for the one or more related assets based on the traversal;

determine contextual data for the one or more related assets based on the asset relationship data, wherein the contextual data comprises one or more events associated with the one or more related assets, and wherein the asset relationship data comprises a relationship between a first fault priority data associated with a first asset from the portfolio of assets and a second fault priority data associated with a second asset from the portfolio of assets;

indicate whether the one or more related assets are associated with a fault based on the relationship between the first fault priority data associated with a first asset from the portfolio of assets and the second fault priority data associated with a second asset from the portfolio of assets;

determine prioritized actions for the portfolio of assets based on the contextual data and the fault; and provide the dashboard visualization to an electronic interface of a computing device, the dashboard visualization comprising the prioritized actions for the portfolio of assets.

2. The system of claim 1, the asset relationship data comprising a relationship between the first fault priority data associated with the first asset from the portfolio of assets and the second fault priority data associated with the second asset from the portfolio of assets, and the one or more programs further comprising instructions configured to:

determine the contextual data based on the relationship between the first fault priority data and the second fault priority data.

3. The system of claim 1, the asset relationship data comprising one or more relationships between the aggregated data, and the one or more programs further comprising instructions configured to:

determine the prioritized actions for the portfolio of assets based on the one or more relationships between the aggregated data.

4. The system of claim 1, the asset relationship data comprising one or more relationships between a first portion of the aggregated data associated with an asset from the portfolio of assets and a second portion of the aggregated data associated with the asset, and the one or more programs further comprising instructions configured to:

determine the prioritized actions for the portfolio of assets based on the one or more relationships between the first portion of the aggregated data and the second portion of the aggregated data.

5. The system of claim 1, the asset relationship data comprising one or more relationships between a first portion of the aggregated data associated with the first asset from the portfolio of assets and a second portion of the aggregated data associated with the second asset from the portfolio of assets, and the one or more programs further comprising instructions configured to:

determine the prioritized actions for the portfolio of assets based on the one or more relationships between the first portion of the aggregated data and the second portion of the aggregated data.

6. The system of claim 1, the one or more programs further comprising instructions configured to:

group the prioritized actions for the portfolio of assets based the contextual data; and configure the dashboard visualization with the prioritized actions based on the grouping of the prioritized actions for the portfolio of assets.

7. The system of claim 1, the one or more programs further comprising instructions configured to:

rank, based on impact of respective prioritized actions with respect to the portfolio of assets, the prioritized actions to generate a list of the prioritized actions; and provide the list of the prioritized actions to the electronic interface via the dashboard visualization.

8. The system of claim 1, the one or more programs further comprising instructions configured to:

determine a list of the prioritized actions for the portfolio of assets based the contextual data; and provide the list of the prioritized actions to the electronic interface via the dashboard visualization.

9. The system of claim 1, the request further comprising a user identifier, the user identifier describing a user role for a user associated with access of the dashboard visualization via the electronic interface, and the one or more programs further comprising instructions configured to:

obtain the aggregated data comprising obtaining the aggregated data based on the user identifier; and configure the dashboard visualization based on the user identifier.

10. The system of claim 1, the one or more programs further comprising instructions configured to:

determine the contextual data for different hierarchy level of assets; and configure the dashboard visualization to provide the contextual data for the different hierarchy level of assets.

11. The system of claim 1, the one or more programs further comprising instructions configured to:

determine an alerts list associated with one or more recommendations for the portfolio of assets based on the prioritized actions for the portfolio of assets;

schedule the prioritized actions based on current condition of the assets to provide an optimal maintenance option; and provide the alerts list to the electronic interface via the dashboard visualization.

12. A method, comprising:

at a device with one or more processors and a memory:

receiving a request to generate a dashboard visualization associated with a portfolio of assets, the request comprising:

an asset descriptor, the asset descriptor describing one or more assets in the portfolio of assets; and in response to the request:

obtaining, based on the asset descriptor, aggregated data associated with one or more related assets;

traversing the aggregated data associated with the one or more related assets;

determining asset relationship data for the one or more related assets based on the traversal;

determining contextual data for the one or more related assets based on the asset relationship data, wherein the contextual data comprises one or more events associated with the one or more related assets, and wherein the asset relationship data comprises a relationship between a first fault priority data associated with a first asset from the portfolio of assets and a second fault priority data associated with a second asset from the portfolio of assets;

indicating, whether the one or more related assets are associated with a fault based on the relationship between the first fault priority data associated with a first asset from the portfolio of assets and the second fault priority data associated with a second asset from the portfolio of assets;

determining prioritized actions for the portfolio of assets based on the contextual data and the fault; and providing the dashboard visualization to an electronic interface of a computing device, the dashboard visualization comprising the prioritized actions for the portfolio of assets.

13. The method of claim 12, the asset relationship data comprising a relationship between the first fault priority data associated with the first asset from the portfolio of assets and the second fault priority data associated with the second asset from the portfolio of assets, and the method further comprising:

determining the contextual data based on the relationship between the first fault priority data and the second fault priority data.

14. The method of claim 12, the asset relationship data comprising one or more relationships between the aggregated data, and the method further comprising:

determining the prioritized actions for the portfolio of assets based on the one or more relationships between the aggregated data.

15. The method of claim 12, the asset relationship data comprising one or more relationships between a first portion of the aggregated data associated with an asset from the portfolio of assets and a second portion of the aggregated data associated with the asset, and the method further comprising:

determining the prioritized actions for the portfolio of assets based on the one or more relationships between the first portion of the aggregated data and the second portion of the aggregated data.

16. The method of claim 12, the asset relationship data comprising one or more relationships between a first portion of the aggregated data associated with the first asset from the portfolio of assets and a second portion of the aggregated data associated with the second asset from the portfolio of assets, and the method further comprising:

determining the prioritized actions for the portfolio of assets based on the one or more relationships between the first portion of the aggregated data and the second portion of the aggregated data.

17. The method of claim 12, further comprising:

grouping the prioritized actions for the portfolio of assets based the contextual data; and configuring the dashboard visualization with the prioritized actions based on the grouping of the prioritized actions for the portfolio of assets.

18. A non-transitory computer-readable storage medium comprising one or more programs for execution by one or more processors of a device, the one or more programs including instructions which, when executed by the one or more processors, cause the device to:

receive a request to generate a dashboard visualization associated with a portfolio of assets, the request comprising:

an asset descriptor, the asset descriptor describing one or more assets in the portfolio of assets; and in response to the request:

obtain, based on the asset descriptor, aggregated data associated with one or more related assets;

traverse the aggregated data associated with the one or more related assets;

determine asset relationship data for the one or more related assets based on the traversal;

determine contextual data for the one or more related assets based on the asset relationship data, wherein the contextual data comprises one or more events associated with the one or more related assets, and wherein the asset relationship data comprises a relationship between a first fault priority data associated with a first asset from the portfolio of assets and a second fault priority data associated with a second asset from the portfolio of assets;

indicate whether the one or more related assets are associated with a fault based on the relationship between the first fault priority data associated with a first asset from the portfolio of assets and the second fault priority data associated with a second asset from the portfolio of assets;

determine prioritized actions for the portfolio of assets based on the contextual data and the fault; and provide the dashboard visualization to an electronic interface of a computing device, the dashboard visualization comprising the prioritized actions for the portfolio of assets.

19. The system of claim 1, wherein the asset relationship data further comprises one or more predicted source assets and one or more predicted target assets for an event, an alarm, and a fault associated with the one or more assets from the portfolio of assets, and wherein the contextual data further comprises at least one of: connected building data, sensor data, real-time data, live property value data, event data, process data, operational data, fault data, asset data, location data, and data associated with the portfolio of assets.

* * * * *